United States Patent
Shimada

(10) Patent No.: US 7,694,081 B2
(45) Date of Patent: Apr. 6, 2010

(54) STORAGE SYSTEM AND METHOD FOR CONTROLLING STORAGE SYSTEM

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 11/494,170

(22) Filed: Jul. 26, 2006

(65) Prior Publication Data

US 2007/0255899 A1 Nov. 1, 2007

(30) Foreign Application Priority Data

Apr. 27, 2006 (JP) ............................. 2006-122952

(51) Int. Cl.
*G06F 12/00* (2006.01)

(52) U.S. Cl. .................. 711/146; 711/141; 711/154; 710/100; 710/317

(58) Field of Classification Search .................. 711/114
See application file for complete search history.

(56) References Cited

U.S. PATENT DOCUMENTS

| | | | | |
|---|---|---|---|---|
| 5,293,489 | A * | 3/1994 | Furui et al. .................. | 710/317 |
| 5,383,181 | A * | 1/1995 | Aramaki ...................... | 370/355 |
| 5,742,625 | A * | 4/1998 | Munetoh et al. ............ | 714/801 |
| 2003/0221062 | A1 * | 11/2003 | Shimada ...................... | 711/114 |
| 2004/0098537 | A1 * | 5/2004 | Serizawa ..................... | 711/112 |
| 2005/0033912 | A1 * | 2/2005 | Abe .............................. | 711/114 |
| 2005/0080923 | A1 * | 4/2005 | Elzur .......................... | 709/238 |

FOREIGN PATENT DOCUMENTS

JP 2005-258918 A 9/2005

* cited by examiner

*Primary Examiner*—Brian R Peugh
*Assistant Examiner*—Kalpit Parikh
(74) *Attorney, Agent, or Firm*—Townsend and Townsend and Crew LLP

(57) ABSTRACT

The invention aims at improving the scalability of a storage system using a switch with a small number of ports.

A storage system includes a plurality of host connection control units 10 connected to host computers; a plurality of drive control units 12 connected to disk drives 13; and a plurality of 4 by 4 switching units 11 located between each of the host connection control units 10 and each of the drive control units 12, and switching a plurality of paths connecting each host connection control unit 10 and each drive control unit 12, wherein the plurality of 4 by 4 switching units 11 is arranged in multiple stages in the direction of information transmission and the 4 by 4 switching units 11 in each stage are connected so that only two paths are defined from a given host connection control unit 10 from among the host connection control units 10, to every drive control unit 12, and the two paths have no parts in common.

2 Claims, 25 Drawing Sheets

FIG.3A — READ REQUEST (C1)

| COMMAND TYPE (READ/WRITE/READ RESPONSE/SPECIAL) | DESTINATION ADAPTER NUMBER/ VOLUME NUMBER | READ BLOCK ADDRESS | DATA LENGTH (NO. OF BLOCKS) | SOURCE ADAPTER NUMBER | PROTECTION CODE |
|---|---|---|---|---|---|

FIG.3B — READ RESPONSE (C2)

| COMMAND TYPE (READ/WRITE/READ RESPONSE/SPECIAL) | DESTINATION ADAPTER NUMBER | READ BLOCK ADDRESS | DATA LENGTH (NO. OF BLOCKS) | SOURCE ADAPTER NUMBER/ VOLUME NUMBER | DATA | PROTECTION CODE |
|---|---|---|---|---|---|---|

FIG.3C — WRITE REQUEST (C3)

| COMMAND TYPE (READ/WRITE/READ RESPONSE/SPECIAL) | DESTINATION ADAPTER NUMBER/ VOLUME NUMBER | WRITE BLOCK ADDRESS | DATA LENGTH (NO. OF BLOCKS) | SOURCE ADAPTER NUMBER | DATA | PROTECTION CODE |
|---|---|---|---|---|---|---|

FIG.3D — ALL-STRIPE WRITE (C4)

| COMMAND TYPE (READ/WRITE/READ RESPONSE/SPECIAL) | DATA DESTINATION ADAPTER NUMBER/ VOLUME NUMBER 0 | DATA WRITE BLOCK ADDRESS 0 | DATA DESTINATION ADAPTER NUMBER/ VOLUME NUMBER 1 | DATA WRITE BLOCK ADDRESS 1 | DATA DESTINATION ADAPTER NUMBER/ VOLUME NUMBER 2 | DATA WRITE BLOCK ADDRESS 2 | PARITY DESTINATION ADAPTER NUMBER/ VOLUME NUMBER | PARITY WRITE BLOCK ADDRESS | DATA LENGTH (NO. OF BLOCKS) | SOURCE ADAPTER NUMBER | DATA 0 | DATA 1 | DATA 2 | PROTECTION CODE |
|---|---|---|---|---|---|---|---|---|---|---|---|---|---|---|

FIG.3E — READ-MODIFY-WRITE (C5)

| COMMAND TYPE (READ/WRITE/READ RESPONSE/SPECIAL) | READ-MODIFY DESTINATION ADAPTER NUMBER/ VOLUME NUMBER | READ-MODIFY BLOCK ADDRESS | DIFFERENCE DESTINATION ADAPTER NUMBER/ VOLUME NUMBER | DIFFERENCE DATA BLOCK ADDRESS | DATA LENGTH (NO. OF BLOCKS) | SOURCE ADAPTER NUMBER | DATA | PROTECTION CODE |
|---|---|---|---|---|---|---|---|---|

FIG.3F — DIFFERENTIAL WRITE REQUEST (C6)

| COMMAND TYPE (READ/WRITE/READ RESPONSE/SPECIAL) | DESTINATION ADAPTER NUMBER/ VOLUME NUMBER | WRITE BLOCK ADDRESS | DATA LENGTH (NO. OF BLOCKS) | SOURCE ADAPTER NUMBER | DIFFERENCE DATA | PROTECTION CODE |
|---|---|---|---|---|---|---|

FIG.3G — CORRECTION READ (C7)

| COMMAND TYPE (READ/WRITE/READ RESPONSE/SPECIAL) | DATA-READ DESTINATION ADAPTER NUMBER/ VOLUME NUMBER 0 | DATA-READ DESTINATION BLOCK ADDRESS 0 | DATA-READ DESTINATION ADAPTER NUMBER/ VOLUME NUMBER 1 | DATA-READ DESTINATION BLOCK ADDRESS 1 | DATA-READ DESTINATION ADAPTER NUMBER/ VOLUME NUMBER 2 | DATA-READ DESTINATION BLOCK ADDRESS 2 | DATA LENGTH (NO. OF BLOCKS) | SOURCE ADAPTER NUMBER | PROTECTION CODE |
|---|---|---|---|---|---|---|---|---|---|

FIG.4A

INVALIDATE COMMAND C8

| COMMAND TYPE (READ/WRITE/RESPONSE/SPECIAL) | DESTINATION ADAPTER NUMBER | INVALIDATE COMMAND | DATA LENGTH (NO. OF BLOCKS) | INVALIDATE VOLUME NUMBER | PROTECTION CODE |
|---|---|---|---|---|---|

FIG.4B

VIRTUALIZATION SETTING COMMAND C9

| COMMAND TYPE (READ/WRITE/RESPONSE/SPECIAL) | VIRTUAL VOLUME NUMBER | VIRTUAL BLOCK ADDRESS | VIRTUALIZATION DATA LENGTH (NO. OF BLOCKS) | REAL ADAPTER NUMBER/VOLUME NUMBER | REAL BLOCK ADDRESS | PROTECTION CODE |
|---|---|---|---|---|---|---|

FIG.4C

VIRTUALIZATION SETTING COMMAND (WITH DESIGNATION OF STAGE) C10

| COMMAND TYPE (READ/WRITE/RESPONSE/SPECIAL) | VIRTUAL VOLUME NUMBER | VIRTUAL BLOCK ADDRESS | VIRTUALIZATION DATA LENGTH (NO. OF BLOCKS) | REAL ADAPTER NUMBER/VOLUME NUMBER | REAL BLOCK ADDRESS | DESIGNATED STAGE | PROTECTION CODE |
|---|---|---|---|---|---|---|---|

FIG.13

MAPPING TABLE

| VIRTUAL VOLUME NUMBER | VIRTUAL BLOCK ADDRESS | REAL ADAPTER NUMBER/ VOLUME NUMBER | REAL BLOCK ADDRESS |
|---|---|---|---|
|  |  |  |  |
|  |  |  |  |
|  |  |  |  |

FIG.17

FRONT SIDE CACHING INFORMATION

| VOLUME NUMBER | BLOCK ADDRESS | HOST CONNECTION CONTROL UNIT ADAPTER NUMBER |
|---|---|---|
|  |  |  |
|  |  |  |
|  |  |  |

STORAGE SYSTEM AND METHOD FOR CONTROLLING STORAGE SYSTEM

CROSS-REFERENCES TO RELATED APPLICATIONS

This application relates to and claims priority from Japanese Patent Application No. 2006-122952, filed on Apr. 27, 2006, the entire disclosure of which is incorporated herein by reference.

BACKGROUND

1. Field of the Invention

The invention relates to a storage system in which channel adapters, connected to one or more host systems (host computers) each, and disk adapters, connected to disk drives, are connected via some switches. More specifically, the invention relates to technology on switching paths between host systems (host computers) and disk adapters.

2. Description of Related Art

In a conventional storage system, in which channel adapters, which control connection to one or more host systems (host computers) each, and disk adapters, which control connection to disk drives, are connected via a switch, a configuration is adopted where the storage system is provided with cache memory made from semiconductor memory, which enables faster data access than a disk drive does, and temporarily stores data sent from the host computers in that cache memory, so that high-speed data input/output operation to/from the host computer can be realized. This type of storage system is configured to switch a plurality of paths between channel adapters and disk adapters using some switches (see JP Patent Laid-open Publication No. 2005-258918).

SUMMARY

Since a conventional storage system switches a plurality of paths between channel adapters and disk adapters using some switches arranged in a single-stage structure, each having, for example, 8 ports (connection ports), if it is necessary to increase the number of paths together with an increase in the number of channel adapters and disk adapters, it is also necessary to increase the number of ports that each switch has in accordance with the required number of paths. In other words, the overall scalability of the system is restricted by the number of ports that each switch has, so that it is difficult to improve the system scalability.

In consideration of the above-described problems, the invention aims at improving the overall scalability of a storage system using a switch having a small number of ports.

In order to achieve the above object, the invention provides a storage system having: one or more channel adapters sending and receiving data to and from a host computer; one or more disk drives; one or more disk adapters connected to the disk drives and controlling data transmission to and from the disk drives; and a plurality of switches located between the one or more channel adapters and the one or more disk adapters and switching a plurality of paths connecting the one or more channel adapters and the one or more disk adapter, wherein the plurality of switches is connected to form multiple stages in the direction of data transmission.

In the above storage system, the plurality of switches is connected to form a multi-stage structure in the direction of data transmission, and also, the switches are connected so that each channel adapter has a uniquely defined path to a given disk adapter.

By configuring a plurality of paths between channel adapters and disk adapters as described above, even if it is necessary to increase the number of paths together with an increase in the number of channel adapters and disk adapters, a desired number of paths can be obtained by arranging a plurality of switches in multiple stages in the direction of data transmission, without increasing the number of connection ports that each switch has, thus improving the scalability of the entire system. Also, when increasing the number of stages of switches according to the system scale, switches in each stage can be constructed based on the same architecture.

According to the invention, it is possible to improve overall system scalability.

BRIEF DESCRIPTION OF THE DRAWINGS

FIGS. 3 A-G illustrate examples of command packet formats used in the storage system;

FIGS. 4 A-C illustrate examples of other command packet formats used in the storage system;

FIG. 13 illustrates the configuration of the mapping table;

FIG. 17 illustrates the configuration of the front side caching information table;

DETAILED DESCRIPTION OF PREFERRED EMBODIMENTS

Figure 1:
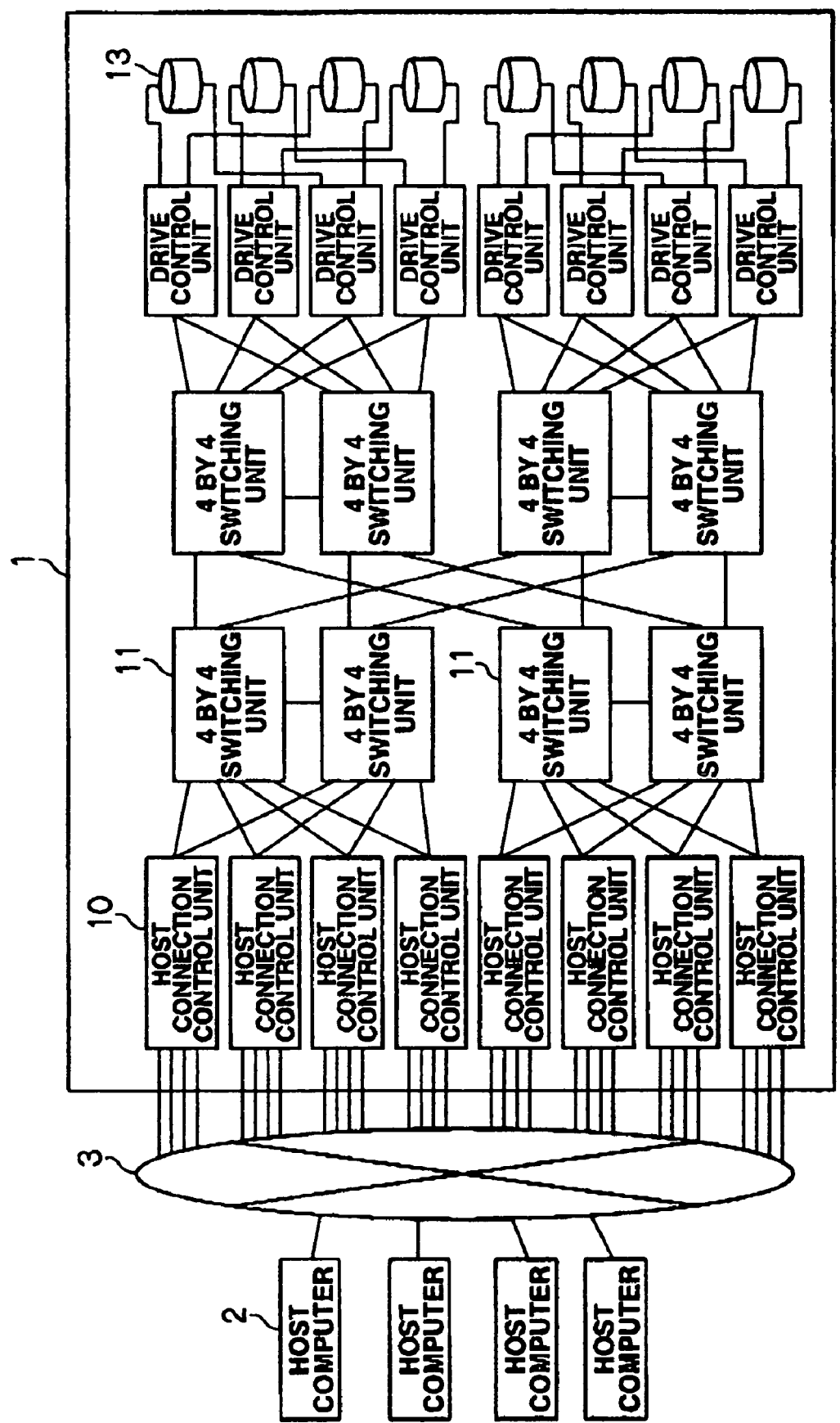
FIG. 1 illustrates an example of the entire system configuration where a storage system according to the invention is connected to host computers.

Embodiments of this invention are described below in detail with reference to the attached drawings. FIG. 1 illustrates the entire system configuration where a storage system 1 according to the invention is connected to host computers 2 via a storage network 3. In FIG. 1, the storage system 1 includes a plurality of disk drives (storage devices) 13, and controls inputs/outputs to/from the disk drives 13 in response to input/output requests received from the plurality of host computers 2 via the storage network 3. The host computers 2 may be provided with an application program operated on an operating system. Examples of the application program include an ATM system for banks and an airline reservation system.

The host computers 2 are connected to the storage system 1 via the storage network 3. The storage network 3 is, for example, a SAN (Storage Area Network), and communication between the host computers 2 and the storage system 1 is performed using Fibre Channel Protocol. The host computers 2 send, for example, data access requests specifying volume numbers and block addresses (requests for data input/output in blocks, hereinafter referred to as "block access requests"), to later-explained host connection control units 10 in the storage system 1.

Each switching unit 11 connects each host connection control unit (channel adapter) 10 and each drive control unit (disk adapter) 12. Commands and data are sent and received to and from the host connection control units 10 and drive control units 12 via the switching units 11, which are 4 by 4 switching units. In FIG. 1, the switching units 11 are configured to form a duplex system in order to improve reliability.

The storage system 1 may include any number of disk drives 13, and the disk drives 13 provide a storage area that the host computers 2 can access via the host connection control units 10, 4 by 4 switching units 11 and drive control units 12. It is also possible to combine the storage areas provided by the disk drives 13 to establish logical volumes.

Figure 2:
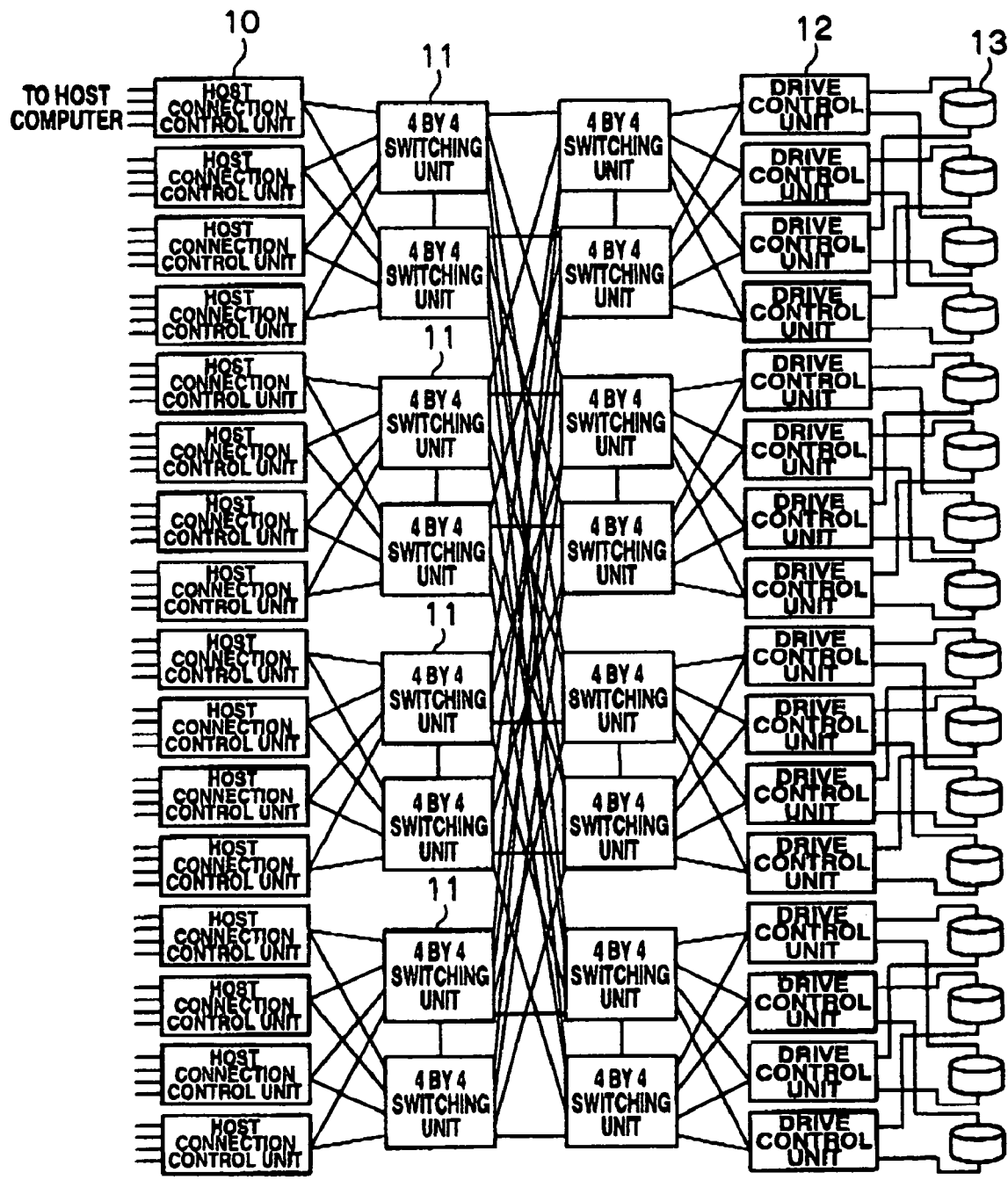
FIG. 2 is a block diagram of a storage system according to an embodiment of the invention.

Next, with reference to FIG. 2, a storage system according to an embodiment of the invention will be explained. FIG. 2 shows the storage system configuration where switching units (switches) 11 are arranged in two stages. In FIG. 2, the storage system has: sixteen host connection control units 10, each connected to host computers; sixteen drive control units 12, each connected to and controlling disk drives 13; and in total sixteen 4 by 4 switching units 11, which are configured to form a duplex system so that a host connection control unit 10 has two paths to any target drive control unit 12, proving redundancy and improving reliability, and also connected to form a two-stage structure in the direction of data transmission.

According to the above configuration, if one host connection control unit 10 is provided with four connection ports (host ports) for connecting to the host computers, 64 ports are provided in total. Likewise, as shown in FIG. 2, if one drive control unit 12 is provided with two connection ports (drive ports) for connecting to the disk drives, 32 ports are provided in total. In that configuration, if, for example, each drive port can accept connections from up to 64 disk drives, even if one disk drive is connected to two ports to obtain duplex connections as shown in FIG. 2, the total number of disk drives 13 will be up to: 32/2×64=1024. If adding more 4 by 4 switching units 11 and connecting them to form a three-stage structure, the total number of 4 by 4 switching units 11 will be up to 96 (if the switching units are configured to form a duplex system), and the number of host connection control units 10 and the number of drive control units 12 will both be up to 64. In this case, 256 host ports and 128 drive ports will be provided in total, and the total number of disk drives 13 will be up to 4096. Moreover, a configuration where the more 4 by 4 switching units 11 are added to form a four-stage structure may be employed. Also, if two 4 by 4 switching units 11 in total are arranged in a single-stage structure, the number of host connection control units 10 and the number of drive control units 12 will both be 4, and 16 host ports and 8 drive ports will be provided in total, and the total number of disk drives will be up to 256.

Each of the switching units 11, host connection control units 10 and drive control units 12 sends and receives information based on the commands explained below.

FIG. 3 illustrates examples of command packet formats used in a storage system according to the invention.

A read request command C1 is a command issued in response to a data read request received from a host computer, and is transmitted in the direction from the host connection control units 10 to the drive control units 12. In the example shown in FIG. 3A, this command is composed of: a command type indicating a read request; a destination adapter number indicating a destination drive control unit 12 and a volume number for specifying a target volume in disk drive(s); a read block address; a read data length; the source adapter number identifying the source host connection control unit 10 to which the read result is to be returned; and a protection code for detecting and correcting data failure.

A read response command C2 is a command to send back the result of read-out data from the disk drives 13 in accordance with a read request, and is transmitted in the direction from the drive control units 12 to the host connection control units 10. In the example shown in FIG. 3B, this command is composed of, like a read request command, a command type indicating a read response; a destination adapter number for specifying a destination host connection control unit 10; a read block address; a read data length; the source adapter number identifying the source drive control unit 12; a volume number; data as the read result; and a protection code.

A write request command C3 is a command issued in response to a data write request received from a host computer, and it is transmitted in the direction from the host connection control units 10 to the drive control units 12. In the example shown in FIG. 3C, this command is composed of: a command type indicating a write request; a destination adapter number indicating a destination drive control unit 12 and a volume number for specifying a target volume in disk drive(s) 13; a write block address; a write data length; the source adapter number identifying the source host connection control unit 10; data to be written; and a protection code. The source adapter number in a write request can be used, for example, for reporting any data-write failure of the disk drives 13 to the source host connection control unit 10.

An all-stripe-write command C4 is a command used when data is to be written with RAID parity where the write data has all data blocks required for the RAID parity generation. This command is transmitted in the direction from the host connection control units 10 to the drive control units 12. In the example shown in FIG. 3D, the command is composed of: a command type indicating all-stripe-write; three sets (0, 1, and 2) of a destination adapter number indicating a data destination drive control unit 12 and a volume number for specifying a target volume in disk drive(s) 13, together with a write block address; a parity destination adapter number indicating destination drive control unit 12 and a volume number for specifying a target volume for the RAID parity in disk drive(s) 13; a write block address for the RAID parity; a data length; the source adapter number identifying the source host connection control unit 10; three pieces (0, 1, and 2) of data; and a protection code.

A read-modify-write command C5 is a command used when data is to be written with RAID parity where the write data has only a part of the data blocks required for the RAID parity generation. This command is transmitted in the direction from the host connection control units 10 to the drive control units 12. In the example shown in FIG. 3E, the command is composed of: a command type indicating a read-modify-write; a read-modify-write destination adapter number for specifying a drive control unit 12 used for writing data and a volume number for specifying a target volume for writing data in disk drive(s); a read-modify-write block address to which data is to be written; a difference destination adapter number for specifying a drive control unit 12 used for modifying the RAID parity and a volume number for specifying a parity volume for modifying the RAID parity in disk drive(s); a difference data block address to which the parity is to be written; a data length; a source adapter number identifying the source host connection control unit 10; data to be written; and a protection code.

A differential write request command C6 is a command used if it is necessary to modify the RAID parity data stored in the disk drives as a result of the read-modify-write processing. This command is transmitted in the direction from the 4 by 4 switching units 11 to the drive control units 12. In the example shown in FIG. 3F, this command is composed of: a command type indicating a differential write request; a destination adapter number showing a destination drive control unit 12 and a volume number for specifying a target volume in disk drive(s); a differential write block address; a write data length; a source adapter number identifying the source host connection control unit 10; data to be written; and a protection code. Since a differential write request command is generated based on a read-modify-write command C5, the source host connection control unit 10 in a differential write request command may be the same as that in the corresponding read-modify-write command C5.

A correction read command C7 is a command used for reading data using a data-recovery function based on RAID if a failure occurs in a certain drive or in a data block. This command is transmitted in the direction from the host connection control units 10 to the drive control units 12. In the example shown in FIG. 3G, this command is composed of: a command type indicating a correction read; three sets (0, 1, and 2) of a data-read destination adapter number showing a data-read destination drive control unit 12 and a volume number for specifying a target volume in disk drive(s), together with a block address from which data is to be read; a data length; a source adapter number identifying the source host connection control unit 10; and a protection code.

FIG. 4 illustrates examples of the packet formats for an invalidate command and a virtualization setting command used in the storage system according to the invention.

An invalidate command C8 is a command used for invalidating data stored in a front side cache 104 in a host connection control unit 10 if the data becomes obsolete. This command is transmitted in the direction from the 4 by 4 switching units 11 to the host connection control units 10. In the example shown in FIG. 4A, this command is composed of: a command type indicating an invalidate command; a destination adapter number showing a destination host connection control unit 10; an invalidate block address indicating an invalidation target block address: a length of data to be invalidated; a volume number for an invalidation target volume; and a protection code.

A virtualization setting command C9 is a command used for setting, in the 4 by 4 switching units 11, the mapping function between a virtual volume and a real volume for the virtualization. This command is transmitted from the host connection control units 10, or a supervisor terminal or similar, to the 4 by 4 switching units 11. In the example shown in FIG. 4B, this command is composed of: a command type indicating a virtualization setting command; a virtual volume number to be virtualized; a virtual block address; a length of data to be virtualized: a real adapter number indicating a drive control unit 12 specified as a result of virtualization and a real volume number to which the virtual volume number is to be translated; a real block address to which the virtual block address is to be translated; and a protection code. Also, when, as shown in FIG. 2, the 4 by 4 switching units 11 are connected in two or more stages, and a virtualization setting command is transmitted from the host connection control units 10, a virtualization setting command C10 designating a specific stage for which virtualization is to be set may be used for that command, as shown in FIG. 4C, whereby virtualization is set for the 4 by 4 switching units 11 in a specific stage.

Figure 5:
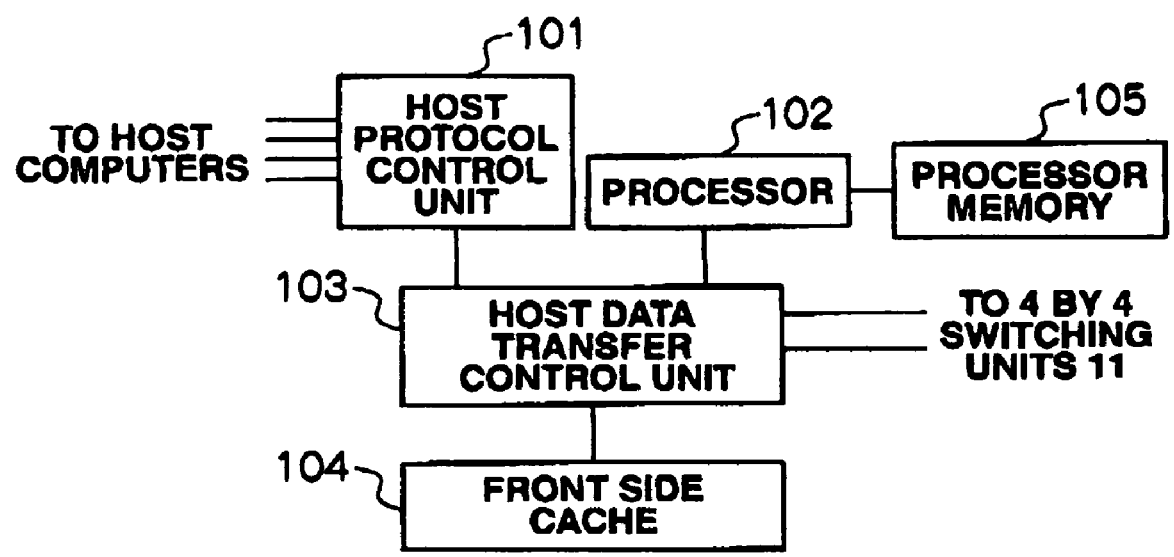
FIG. 5 is a block diagram of the host connection control unit.

As shown in FIG. 5, each host connection control unit 10 has a host protocol control unit 101, a processor 102, a host data transfer control unit 103, a front side cache 104, and a processor memory 105. The host protocol control unit 101 controls the communication protocol processing used for connection to the host computers. The communication protocol is, for example, Fibre Channel. The processor 102 executes control programs stored in the processor memory 105, and controls all over the host connection control unit 10. The processor memory 105 is also used for storing the data that the processor 102 reads and writes while the processor 102 executes the control programs. The host data transfer control unit 103 is controlled by the processor 102, and sends data stored in the front side cache 104 to the host computers via the host protocol control unit 101 and receives data from the host computers via the host protocol control unit 101 and stores the data in the front side cache 104. The host data transfer control unit 103 also transfers data between the front side cache 104 and the 4 by 4 switching units 11.

Figure 6:
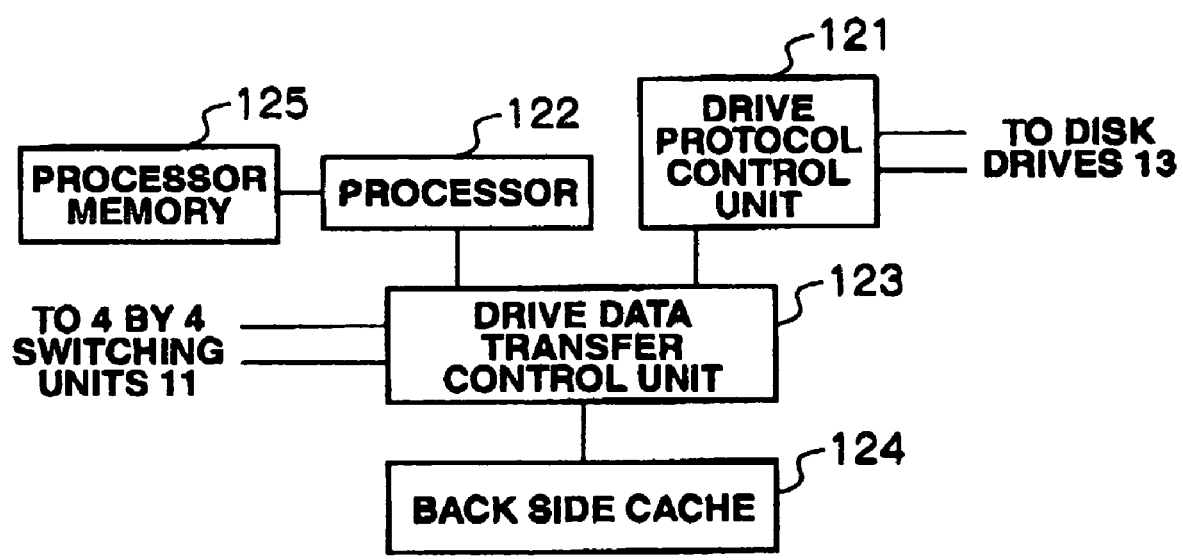
FIG. 6 is a block diagram of the drive control unit.

As shown in FIG. 6, each drive control unit 12 has a drive protocol control unit 121, a processor 122, a drive data transfer control unit 123, a back side cache 124, and a processor memory 125. The drive protocol control unit 121 controls the communication protocol used for connection to the disk drives 13. The communication protocol is, for example, Fibre Channel AL (Arbitrated Loop), SAS (Serial Attached SCSI), SATA (Serial ATA), or similar. The processor 122 executes control programs stored in the processor memory 125, and controls all over the drive control unit 12. The processor memory 125 is also used for storing the data that the processor 122 reads and writes while the processor 122 executes the control programs. The drive data transfer control unit 123 is controlled by the processor 122, and sends data stored in the back side cache 124 to the disk drives 13 via the drive protocol control unit 121 and receives data from the disk drives 13 via the drive protocol control unit 121 and stores the data in the back side cache 124. The drive data transfer control unit 123 also transfers data between the back side cache 124 and the 4 by 4 switching units 11.

Figure 7:
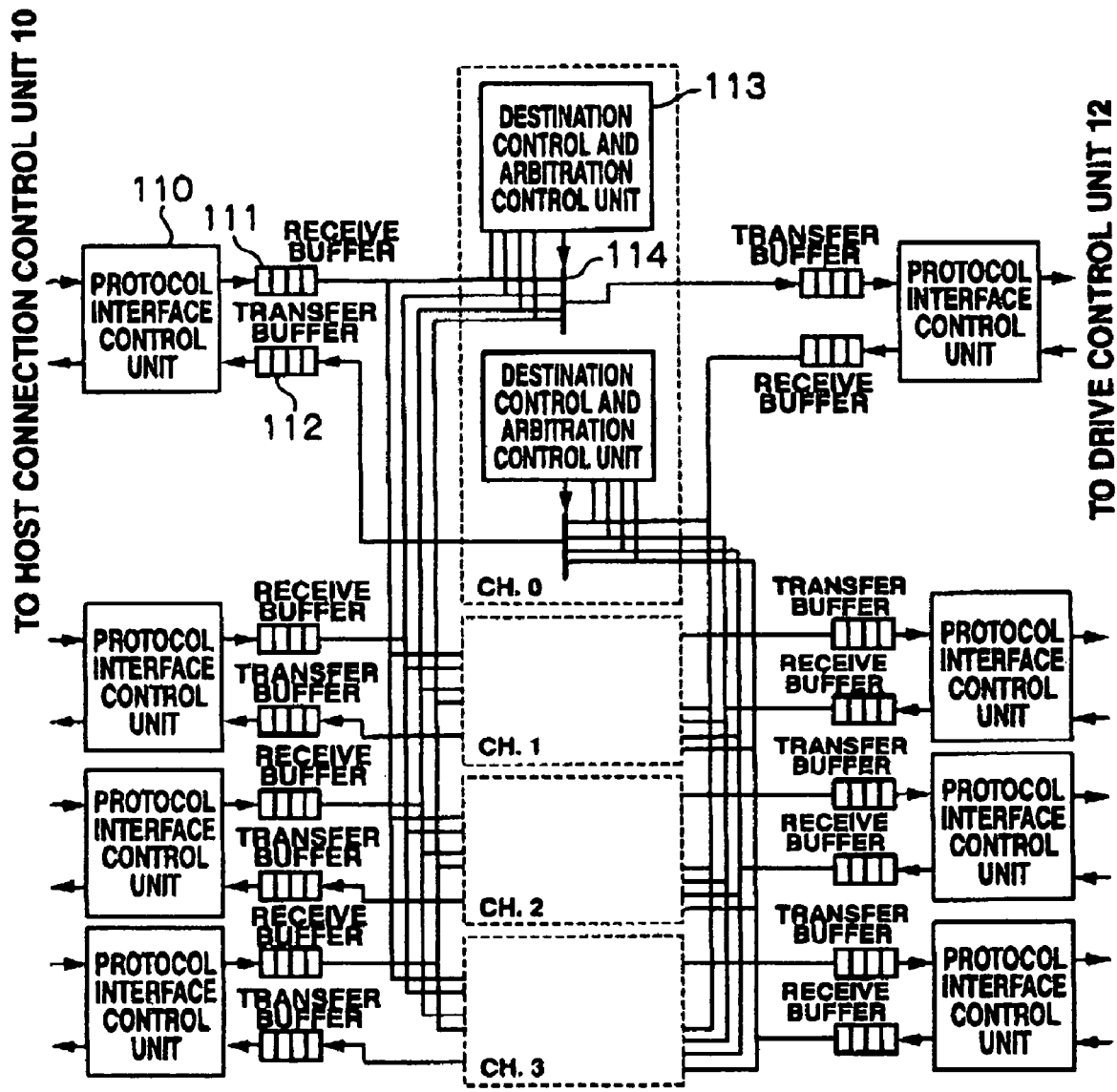
FIG. 7 is a block diagram of a switching unit according to a first embodiment of the invention.

As shown in FIG. 7, each 4 by 4 switching unit 11 has: protocol interface control units 110 that are connected to the host connection control units 10, drive control units 12 and other 4 by 4 switching units 11, and send data to and receive data from them; receive buffers 111 for storing data that the protocol interface control units 110 receive; transfer buffers 112 for storing data to be transmitted via the protocol interface control units 110; destination control and arbitration control units 113 for analyzing the first data unit stored in each of the receive buffers 111 to find each destination, and controlling the arbitration among those first data units to be transmitted; and selectors 114 that are controlled by the destination control and arbitration control units 113, and select the first data unit to be transmitted from among the first data units stored in the receive buffers 111 and transmit the first data to the corresponding transfer buffer 112. The 4 by 4 switching unit 11 shown in FIG. 7 has in total eight connection ports (switch ports) so that connection can be established with four host connection control units 10 or other 4 by 4 switching units 11, as well as four drive control units 12 or other 4 by 4 switching units 11, and it also has eight protocol interface control units 110 in total. Also, each protocol interface control unit 110 is provided with one receive buffer 111 and one transfer buffer 112; i.e., there are eight receive buffers 111 and eight transfer buffers 112 in total. Moreover, each transfer buffer 112 is provided with one destination control and arbitration control unit 113 and one selector 114; i.e., there are eight destination control and arbitration control units 113 and eight selectors 114.

Figure 8:
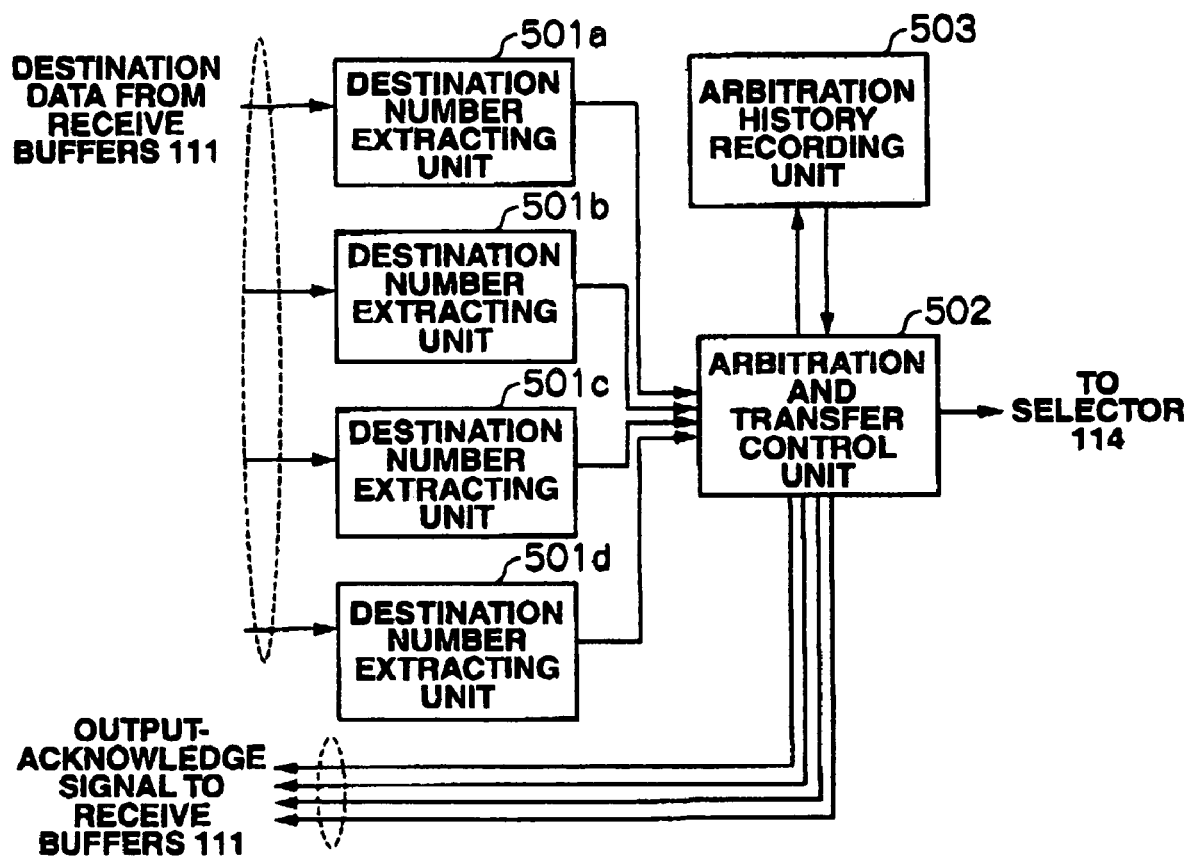
FIG. 8 is a block diagram of the destination control and arbitration control unit.

As shown in FIG. 8, each destination control and arbitration control unit 113 consists of four destination number extracting units 501a to 501d, an arbitration and transfer control unit 502 and an arbitration history recording unit 503. Each destination control and arbitration control unit 113 is associated with each transfer buffer 112 connected to each connection port, and based on the commands input from four connection ports from the other side, controls data transfer to the associated transfer buffer 112 connected to that connection port. More specifically, if the receive buffer 111 receives a certain command, the four destination number extracting units 501a to 501d receive destination data included in that command. The destination data sent from the receive buffer 111 is, for example, a destination adapter number included in each command, shown in FIGS. 3A to 3G. The destination number extracting units 501a to 501d check the destination data that they have received, determine whether the command is to be transmitted to the associated transfer buffer 112 connected to the connection port, and output the result of that determination to the arbitration and transfer control unit 502. Receiving that determination result from the destination number extracting units 501a to 501d, the arbitration and transfer control unit 502 controls the selector 114 by generating a control signal for controlling the selector 114 so that each command whose destination has been found to be the corresponding transfer buffer 112 will be transmitted to that transfer buffer 112, and sends back to that receive buffer 111 an output-acknowledge signal for the receive buffer 111 to transfer all the data included in the command to the transfer buffer 112 and to output the next received command.

If the arbitration and transfer control unit 502 receives, two or more commands whose destinations have been found to be the associated transfer buffer 112 at the same time, it performs arbitration between those commands, i.e., decides which command is to be transmitted to the associated transfer buffer 112 first. In this case, the arbitration and transfer control unit 502 refers the previously performed arbitration results, which are recorded in the arbitration history recording unit 503, and for example, performs arbitration control so that the arbitration results are as even as possible. Every time a new arbitration is performed, that arbitration result will be recorded in the arbitration history recording unit 503, and if the arbitration result data becomes obsolete to some extent, that data may be deleted from the arbitration history recording unit 503.

According to the above-described embodiment, even if it is necessary to increase the number of paths together with an increase in the number of channel adapters and disk adapters, a desired number of paths can be obtained by arranging a plurality of switches in multiple stages in the direction of data transmission, without increasing the number of connection ports that each switch has, thus improving the scalability of the entire system. Also, when increasing the number of stages of switches according to the system scale, switches in each stage can be constructed based on the same architecture.

Figure 9:
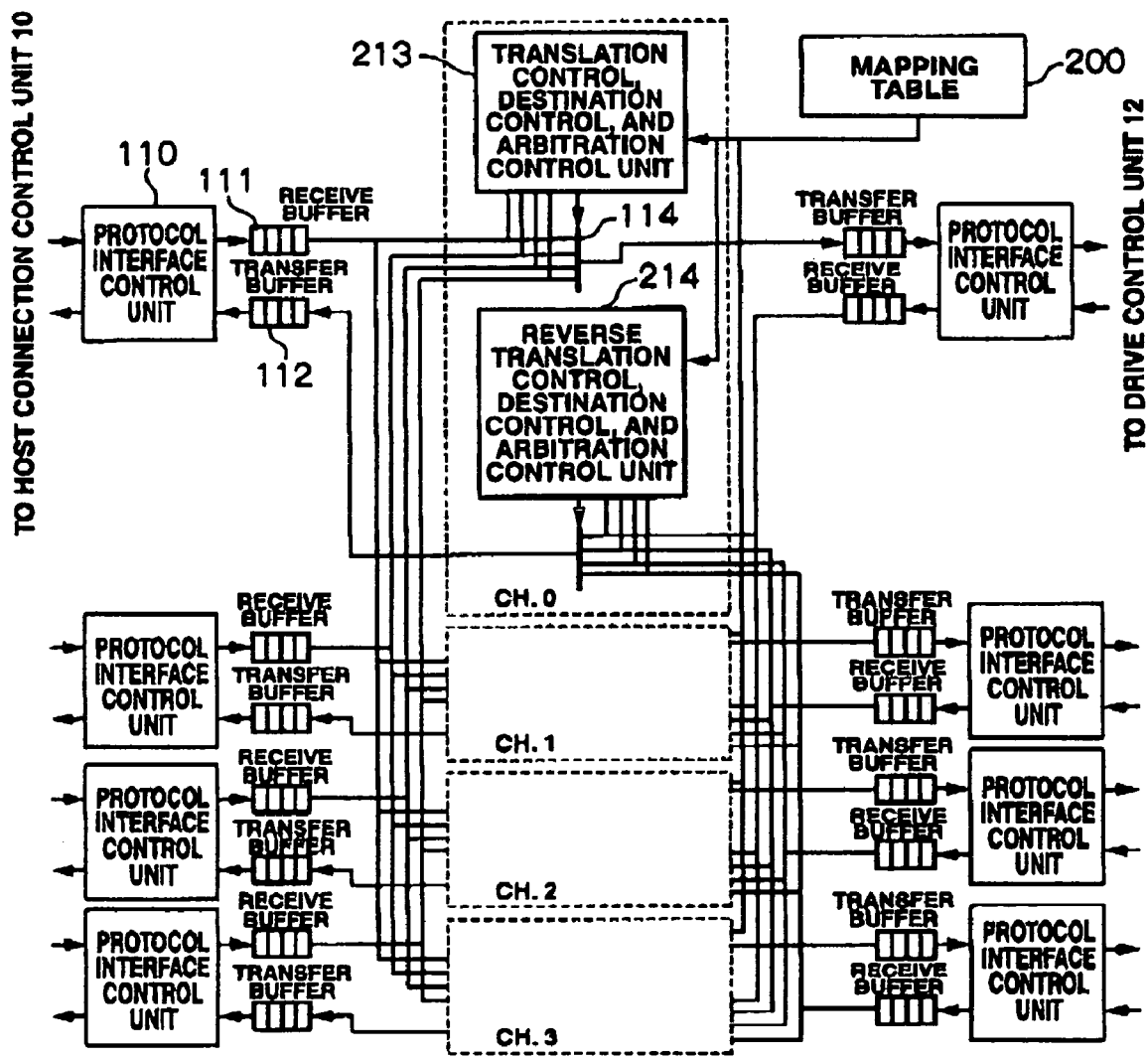
FIG. 9 is a block diagram of a switching unit according to a second embodiment of the invention.

Next, a switch according to a second embodiment of the invention will be explained with reference to FIG. 9. In this embodiment, a virtualization function is added to the 4 by 4 switching units 11, and so each switching unit has a mapping table 200 for storing information regarding the virtualization. Also, instead of the destination control and arbitration control units 113 in FIG. 7, each 4 by 4 switching unit 11 has four translation control, destination control, and arbitration control units 213 and four reverse translation control, destination control, and arbitration control units 214. The remaining configuration of the 4 by 4 switching unit 11 is the same as in FIG. 7. If the 4 by 4 switching units 11 are connected to form two or more stages as shown in FIG. 2, a virtualization function may be added to only the 4 by 4 switching units 11 located the closest to the host connection control units 10 (i.e., the switching units directly connected to the host connection control units 10).

Figure 10:
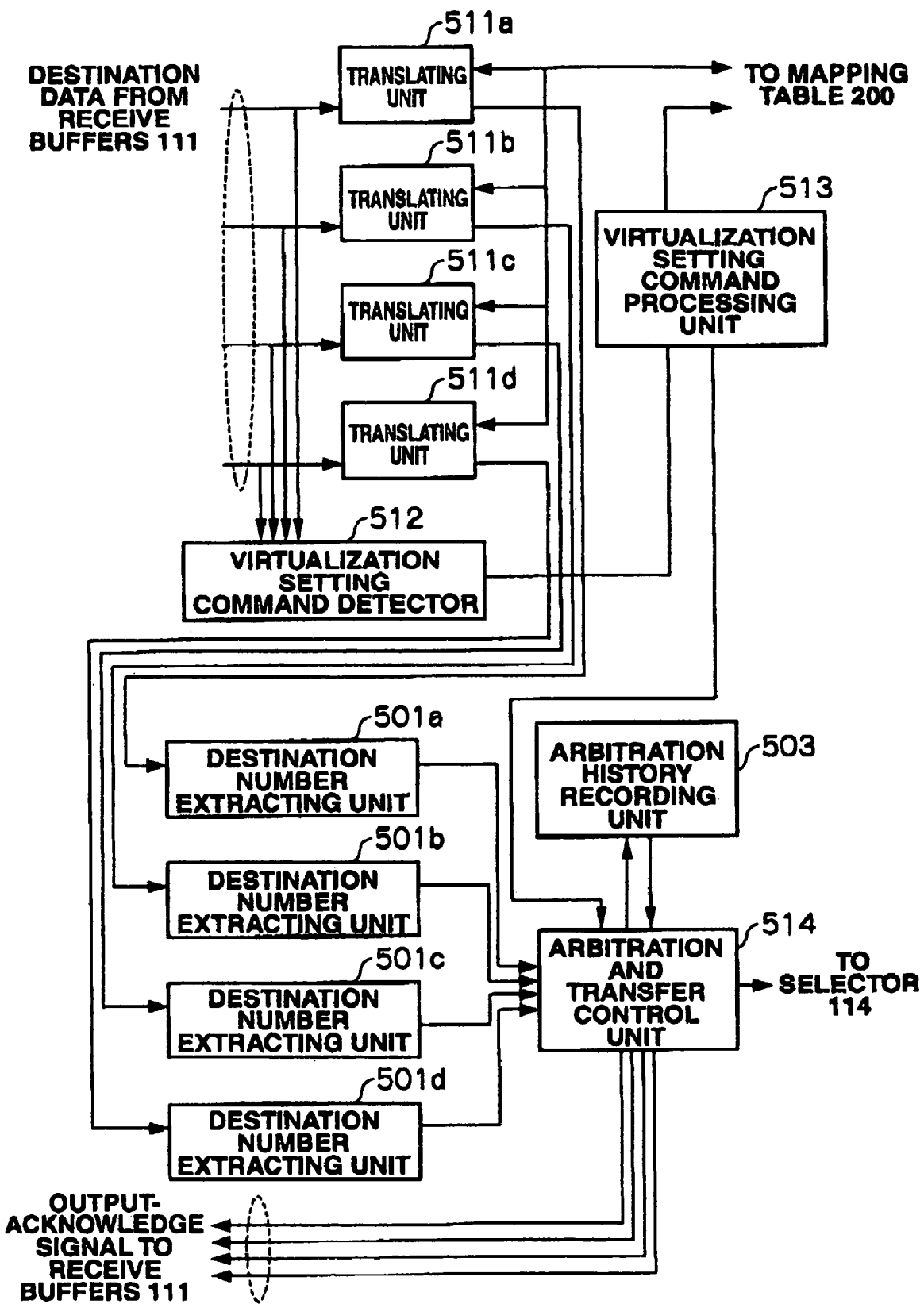
FIG. 10 is a block diagram of the translation control, destination control, and arbitration control unit.

A translation control, destination control, and arbitration control unit 213 is associated with the every transfer buffer 112 in the direction leading to the drive control units 12, and controls commands sent from the host connection control units 10 to the drive control units 12. As shown in FIG. 10, in addition to the configuration of the destination control and arbitration control unit 113 shown in FIG. 8, this control unit 213 has translating units 511a to 511d, a virtualization setting command detector 512 and a virtualization setting command processing unit 513, and also inputs/outputs signals to/from the mapping table 200. More specifically, each input command, if it is not a virtualization setting command, first undergoes a translation process at the translating unit 511a, 511b, 511c and 511d (this process corresponds to the process at the step 703 and the following steps in FIG. 12, which are explained later). If it is a virtualization setting command, the command is detected at the virtualization setting command detector 512, and then is sent to the virtualization setting command processing unit 513 and is executed by that unit. The process executed for the virtualization setting command by that unit corresponds to the process at the step 709 and the following steps in FIG. 12, which are explained later. In this case, corresponding to the processes shown in FIG. 12, a signal indicating that a virtualization setting command has been executed is transmitted to the arbitration and transfer control unit 514. Other operations regarding FIG. 10 are the same as ones regarding the destination control and arbitration control unit 113 shown in FIG. 8.

Figure 11:
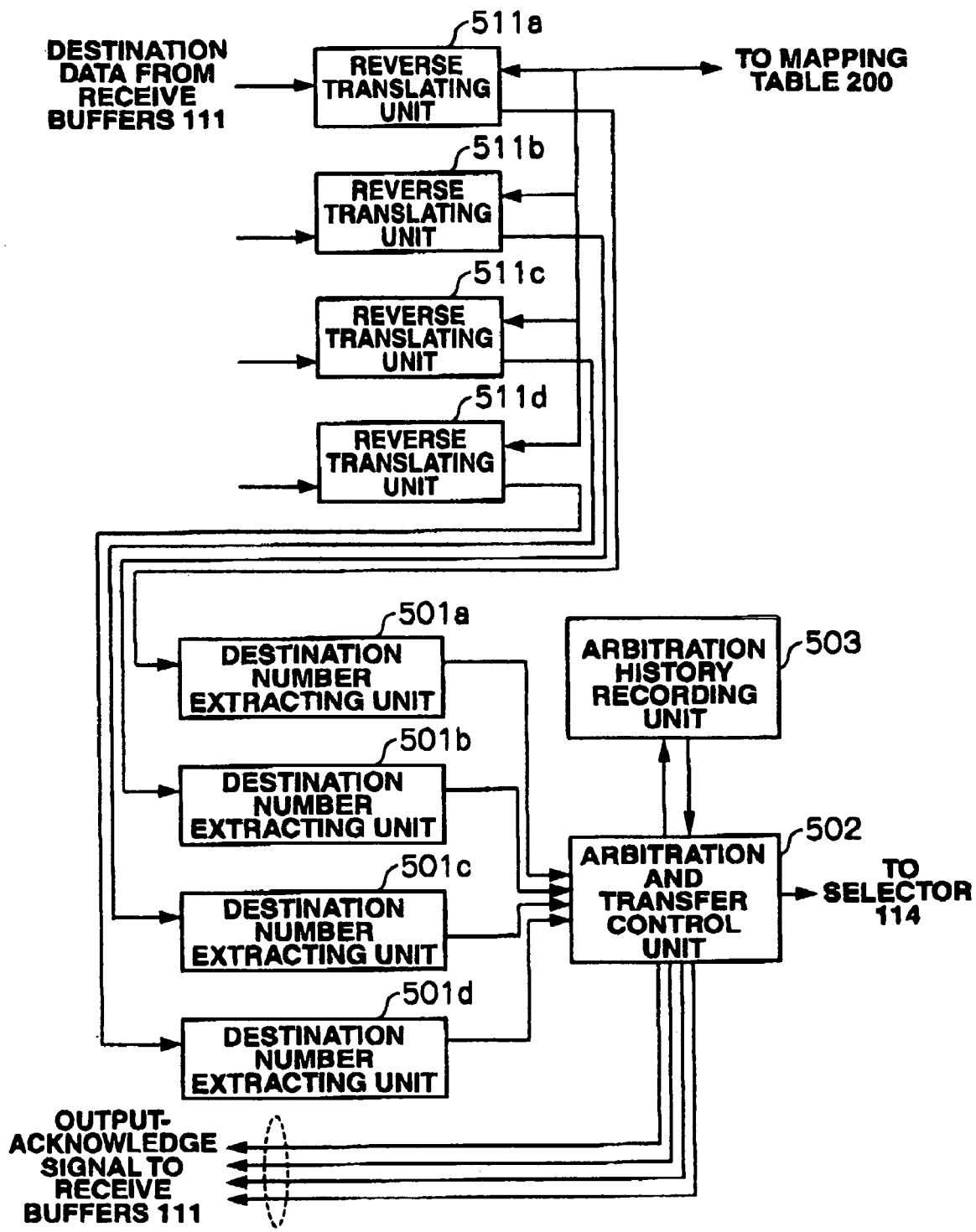
FIG. 11 is a block diagram of the reverse translation control, destination control, and arbitration control unit.

A reverse translation control, destination control, and arbitration control unit 214 is associated with each of the transit buffers 112 in the direction leading to the host connection control units 10, and controls commands sent from the drive control units 12 to the host connection control units 10. As shown in FIG. 11, in addition to the configuration of the destination control and arbitration control unit 113 shown in FIG. 8, this control unit 214 has reverse translating units 521a to 521d, and also inputs/outputs signals to/from the mapping table 200. More specifically, each command input to the reverse translation control, destination control, and arbitration control unit 214 undergoes a reverse translation process at the reverse translating unit 521a, 521b, 521c and 521d. The reverse translation process means the reverse process of the translation process executed in the translating units 511a to 511d shown in FIG. 10, and in this process, an adapter number/volume number and a block address included in the command are regarded as the real adapter number/volume number and the real block address shown in FIG. 13, and, based on those, the mapping table 200 is searched to translate them back to a virtual volume number and a virtual block address. The mapping table 200 shown in FIG. 13 is composed of entries, each having a virtual volume number, virtual block address, a real adapter number/volume number, and a real block address. The example shown in FIG. 13 assumes that an adapter number identifying a drive control unit 12 and a volume number identifying a volume in disk drive(s) connected to that drive control unit 12 are combined, and a unique number is given to each of the combined pairs of an adapter number and a volume number so that each combined pair can be identified by that number.

Figure 12:
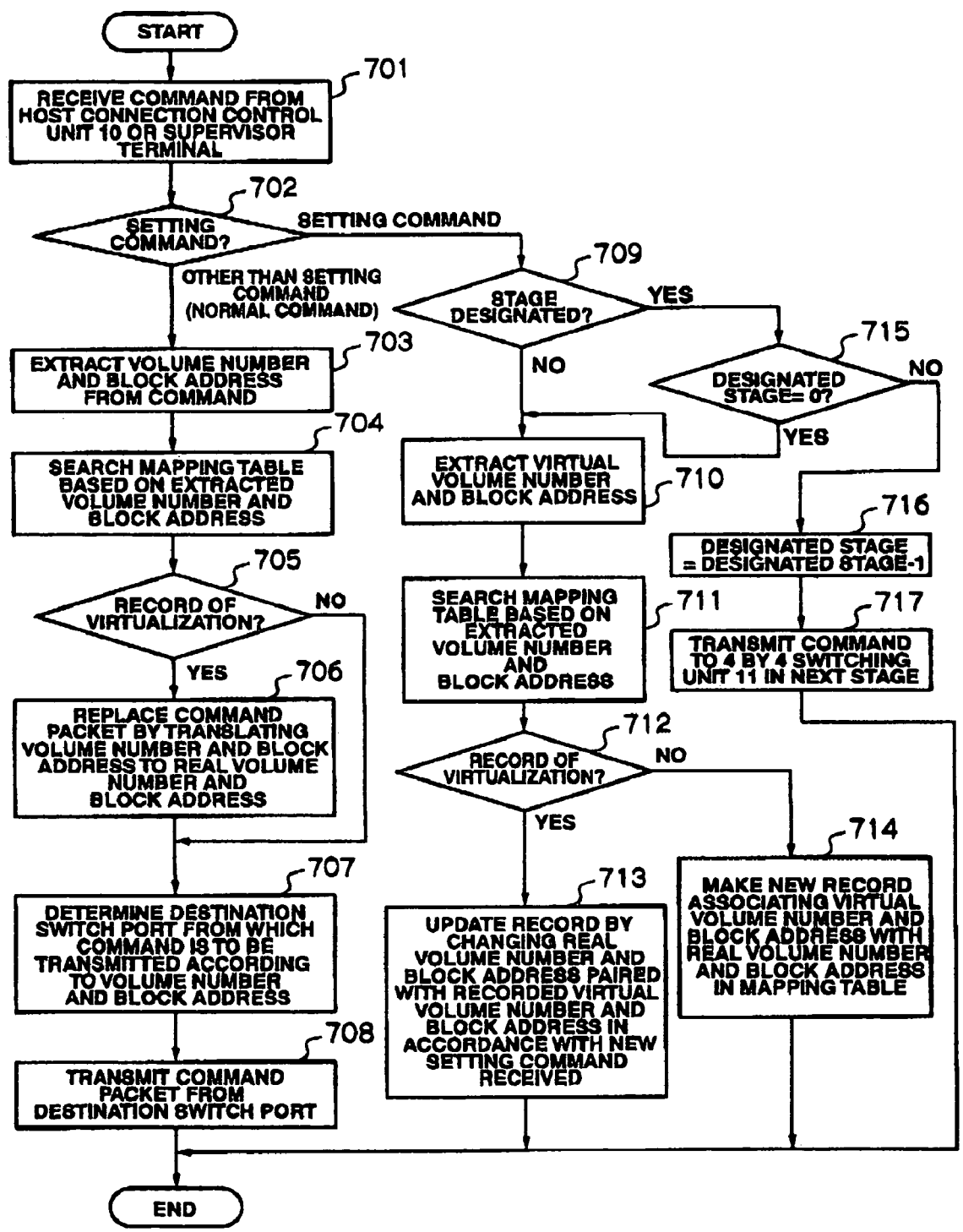
FIG. 12 is a flowchart for explaining a virtualization processing method executed by the switching unit.

Next, the overall operation of the 4 by 4 switching unit 11 according to the second embodiment of the invention will be explained with reference to the flowchart shown in FIG. 12. First of all, in the step 701, a certain command is received from a host connection control unit 10 or a supervisor terminal. In step 702, the received command is checked as to whether it is a virtualization setting command or not. If it is not a virtualization setting command (if it is a normal command), the process goes to the step 703 and a volume number and block address are extracted from the command. Then in the step 704, the mapping table 200 is searched based on the volume number and block address extracted. The search result is checked in the step 705, and if there is a corresponding record of virtualization, the process goes to the step 706, replacing the volume number and block address number with the real adapter/volume number and the real block address of the searched result in the command, and then goes to the step 707. If no corresponding record of virtualization is found in step 705, the process goes directly to the step 707. In the step 707, the destination switch port from which the command is to be transmitted is determined based on the volume number and block address of the command. Then, in the step 708, the command is transmitted from the determined destination switch port to the next 4 by 4 switching unit 11 or the drive control unit 12, and the process ends.

If the received command is a virtualization setting command in step 702, the command is checked in the step 709 as to whether it designates a specific stage for which virtualization is to be set. If there is no designation of a specific stage for which virtualization is to be set, the process goes to the step 710, and a virtual volume number and block address are extracted from the virtualization setting command. Then, in the step 711, the mapping table 200 is searched based on the extracted volume number and block address. The search result is checked in the step 712, and if there is a corresponding record of virtualization, the process goes to the step 713, updating that recorded entry in the mapping table 200 with the new set of volume number and block address of the newly received virtualization setting command, and the process ends. If there is no corresponding record of virtualization exists in the step 712, the process goes to the step 714, adding, a new entry that establishes the virtual volume number and block address as being paired with the real volume number and block address according to the newly received virtualization setting command.

If the command is found in the step 709 to designate a specific stage for which virtualization is to be set, the command is checked in the step 715 as to whether the value of the designated stage is 0 or not. If the value is 0, the command is judged as having reached the designated stage, and the process goes to the step 710 to execute the processes in the step 710 and the following steps. If the value is not 0, the process goes to the step 716, decrementing the value of the designated stage in the virtualization setting command by one. Then, in the step 717, that virtualization setting command is transmitted to the 4 by 4 switching unit 11 in the next stage. In this way, it is possible to execute virtualization setting when the command reaches the designated stage. The above flowchart may be modified, for example, to set a specific value for the judgment in step 715 and compare the value of the designated stage with that specific value.

Figure 14:
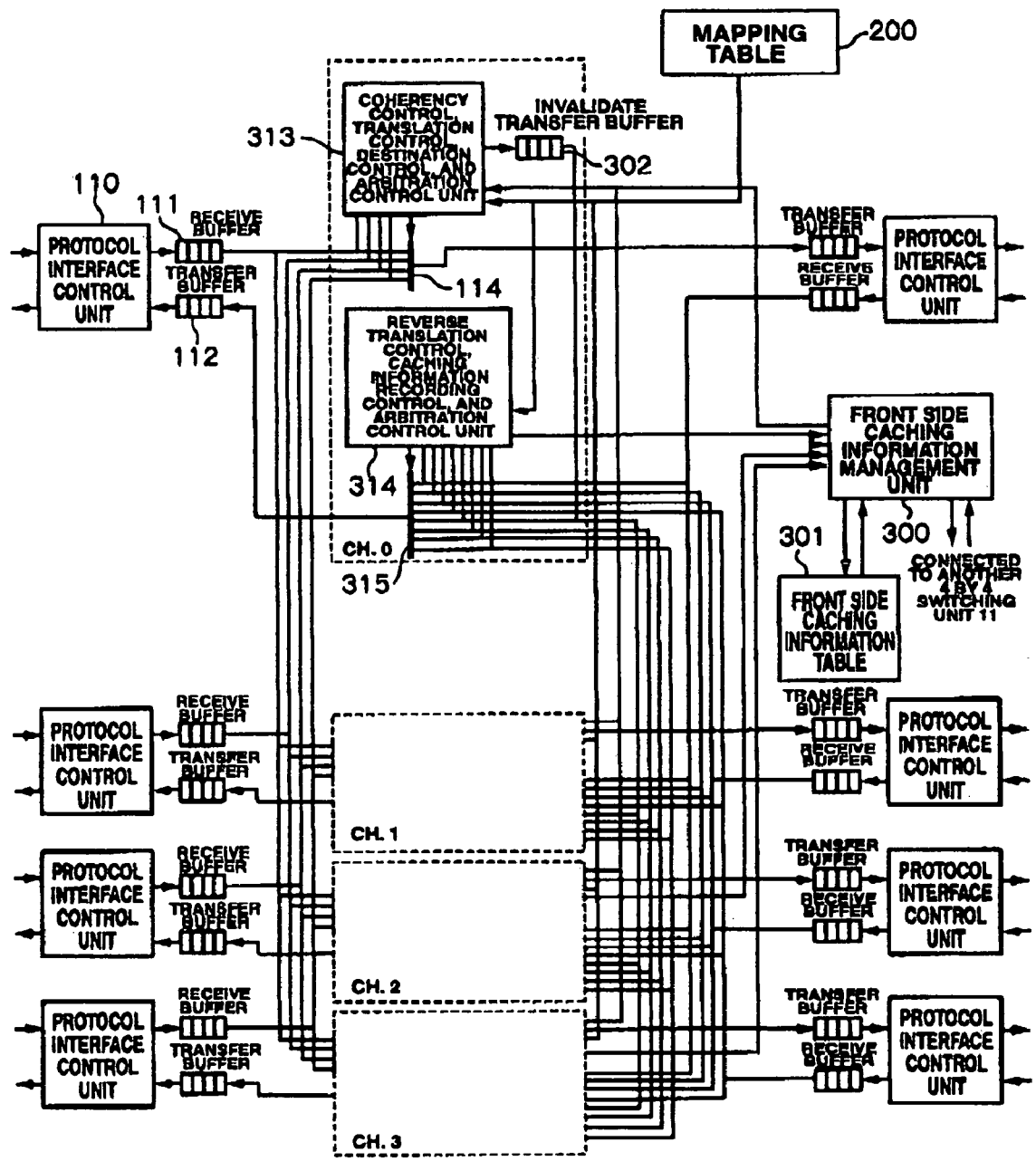
FIG. 14 is a block diagram of a switching unit according to a third embodiment of the invention.

According to the above-described embodiment, even if it is necessary to increase the number of paths together with an increase in the number of channel adapters and disk adapters, a desired number of paths can be obtained by arranging a plurality of switches in multiple stages in the direction of data transmission, without increasing the number of connection ports that each switch has, thus improving the scalability of the entire system. At the same time, virtualization process can be performed at the switching units, and there is no need for any processor in the host connection control units or drive control units to perform any process for that virtualization Next, a 4 by 4 switching unit 11 according to a third embodiment of the invention will be described with reference to FIG. 14. In this embodiment, each 4 by 4 switching unit 11 has additional functions of virtualization and cache coherency, and in addition to the configuration shown in FIG. 9, where a virtualization function has been added, the switching unit according to this embodiment has a front side caching information management unit 300 and a front side caching information table 301. Also, the translation control, destination control, and arbitration control unit 213 shown in FIG. 9 is replaced with a coherency control, translation control, destination control, and arbitration control unit 313, while the reverse translation control, destination control, and arbitration control unit 214 is replaced with a reverse translation control, caching information recording control, and arbitration control unit 314, and the remaining configuration is the same as shown in FIG. 9.

Figure 15:
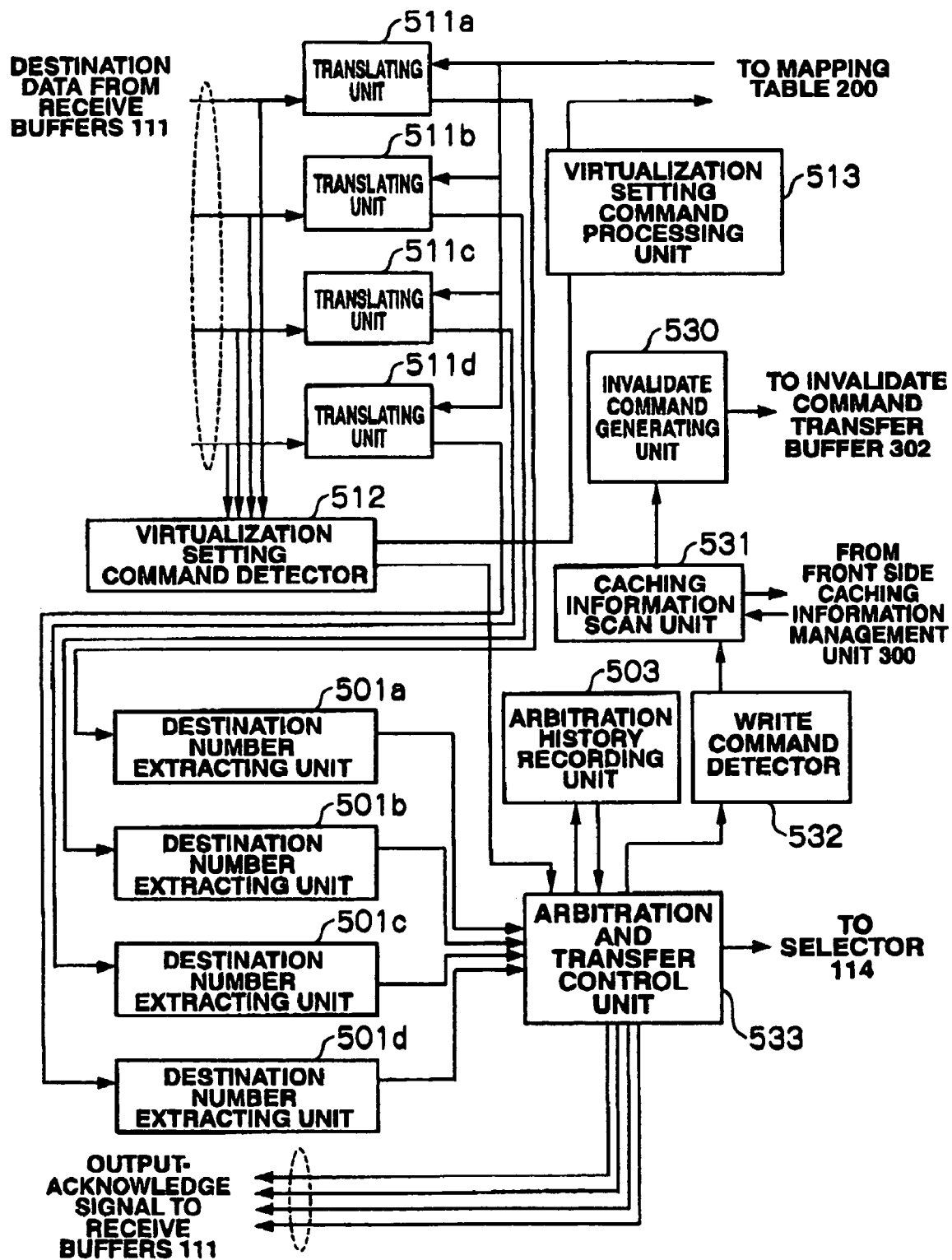
FIG. 15 is a block diagram of the coherency control, translation control, destination control, and arbitration control unit.

A coherency control, translation control, destination control, and arbitration control unit 313 is associated with each of the transfer buffers 112 in the direction leading to the drive control units 12, and controls commands sent from the host connection control units 10 to the drive control units 12. Also, in addition to the configuration of the translation control, destination control, and arbitration control unit 213 shown in FIG. 10, this control unit 313 has, as shown in FIG. 15, an invalidate command generating unit 530, a caching information scan unit 531 and a write command detector 532, and also inputs/outputs signals to/from the front side caching information management unit 300 as well as outputting signals to an invalidate command transfer buffer 302, and furthermore, signals are transmitted from an arbitration and transfer control unit 533 to the write command detector 532. More specifically, the write command detector 532 may detect that a write request command C3 has been transmitted from a host connection control unit 10 to a drive control unit 12 by checking a signal received from the arbitration and transfer control unit 533. When the write command detector 532 detect a write request command, it notifies the caching information scan unit 531 of that detection. Then, the caching information scan unit 531 transmits signals to and from the front side caching information management unit 300, searching the front side caching information accumulated in the front side caching information table 301. After that, if an invalidate command C8 needs to be transmitted, the caching information scan unit 531 instructs the invalidate command generating unit 530 to generate and transmit an invalidate command C8 to the invalidate command transfer buffer 302. Other processes are the same as in the translation control, destination control, and arbitration control unit 213 illustrated in FIG. 10.

Figure 16:
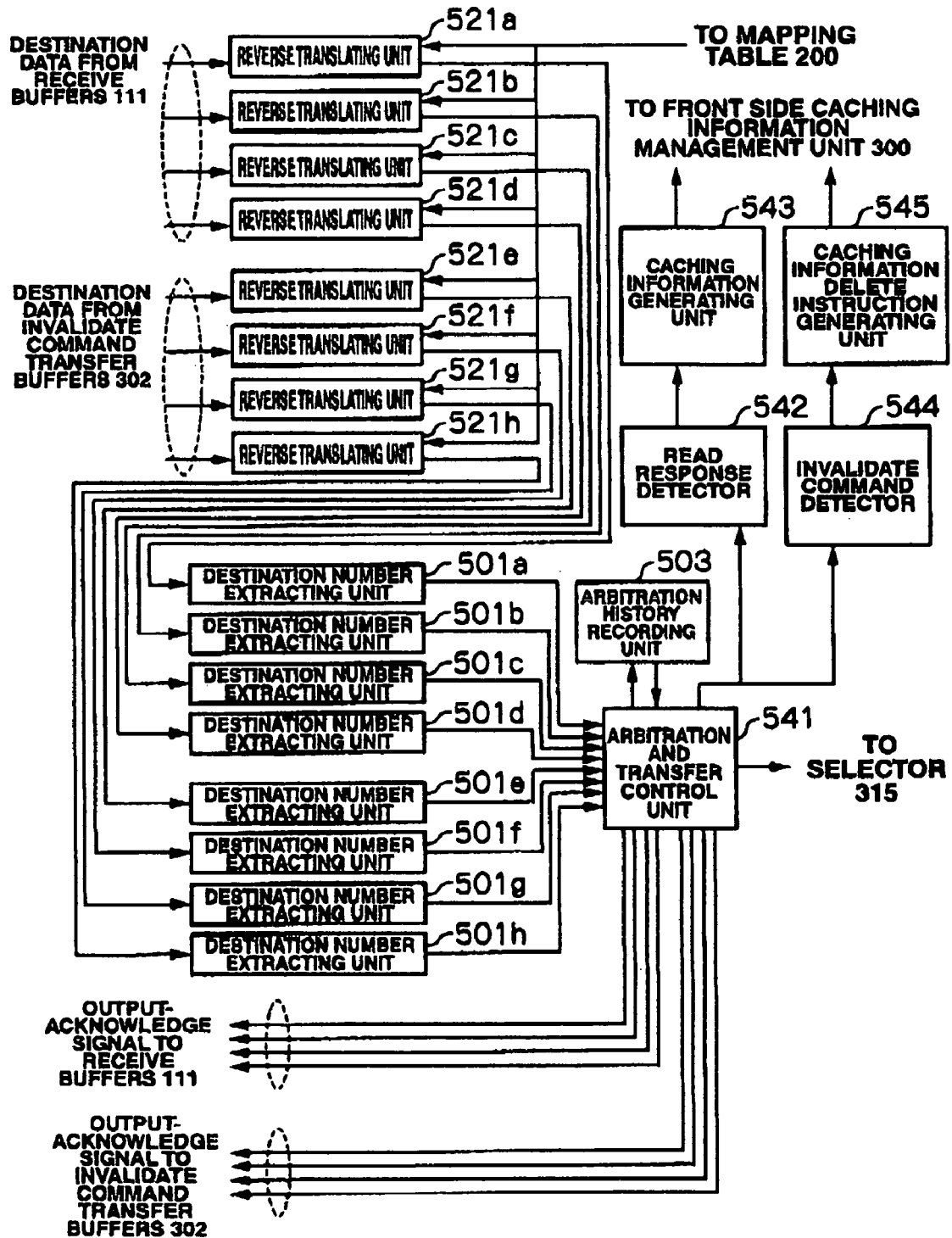
FIG. 16 is a block diagram of the reverse translation control, caching information recording control, and arbitration control unit.

As shown in FIG. 16, a reverse translation control, caching information recording control, and arbitration control unit 314 is associated with each of the transfer buffers 112 in the direction leading to the host connection control units 10, and controls commands sent from the drive control units 12 to the host connection control units 10. In addition to the configuration of the reverse translation control, destination control, and arbitration control unit 214 shown in FIG. 11, which receives input signals from and sends output-acknowledge signals to the four receive buffers 111, this control unit 314 receives input signals from and sends output-acknowledge signals to the four invalidate command transfer buffers 302, and so has eight reverse translating units 521a to 521h and eight destination number extracting units 501a to 501h. Moreover, this control unit 314 has a read response detector 542, a caching information generating unit 543, an invalidate command detector 544 and a caching information delete instruction generating unit 545, and also outputs signals to the front side caching information management unit 300, and furthermore, signals are transmitted from an arbitration and transfer control unit 541 to the read response detector 542 and the invalidate command detector 544. More specifically, the read response detector 542 checks a signal received from the arbitration and transfer control unit 541, and if it detects that a read response has been returned from a drive control unit 12 to a host connection control unit 10, it reports the detection of the read response to the caching information generating unit 543. The caching information generating unit 543 then generates new caching information, for example, a set of a volume number, block address, and host connection control unit adapter number, as shown in FIG. 17, and outputs it to the front side caching information management unit 300, to have it recorded as new front side caching information. FIG. 17 shows an example of the front side caching information, which is a table composed of entries, each having a volume number, block address, and adapter number identifying a host connection control unit 10.

Likewise, the invalidate command detector 544 checks a signal received from the arbitration and transfer control unit 541, and if it detects that an invalidate command C8 has been sent to a host connection control unit 10, it reports the detection of the invalidate command to the caching information delete instruction generating unit 545. The caching information delete instruction generating unit 545 generates an instruction to delete caching information, and outputs it to the front side caching information management unit 300, to have the caching information concerning that invalidate command C8 deleted from the front side caching information. Other processes are the same as in the reverse translation control, destination control, and arbitration control unit 214 shown in FIG. 11.

If the 4 by 4 switching units 11 are configured as duplex switching units, the front side caching information management unit 300 in a 4 by 4 switching unit 11 may have additional signal lines for connection with the other 4 by 4 switching unit, so that the content of the front side caching information tables 301 in both switching units can be kept consistent with each other and back-up copies can be made for each other.

Figure 18:
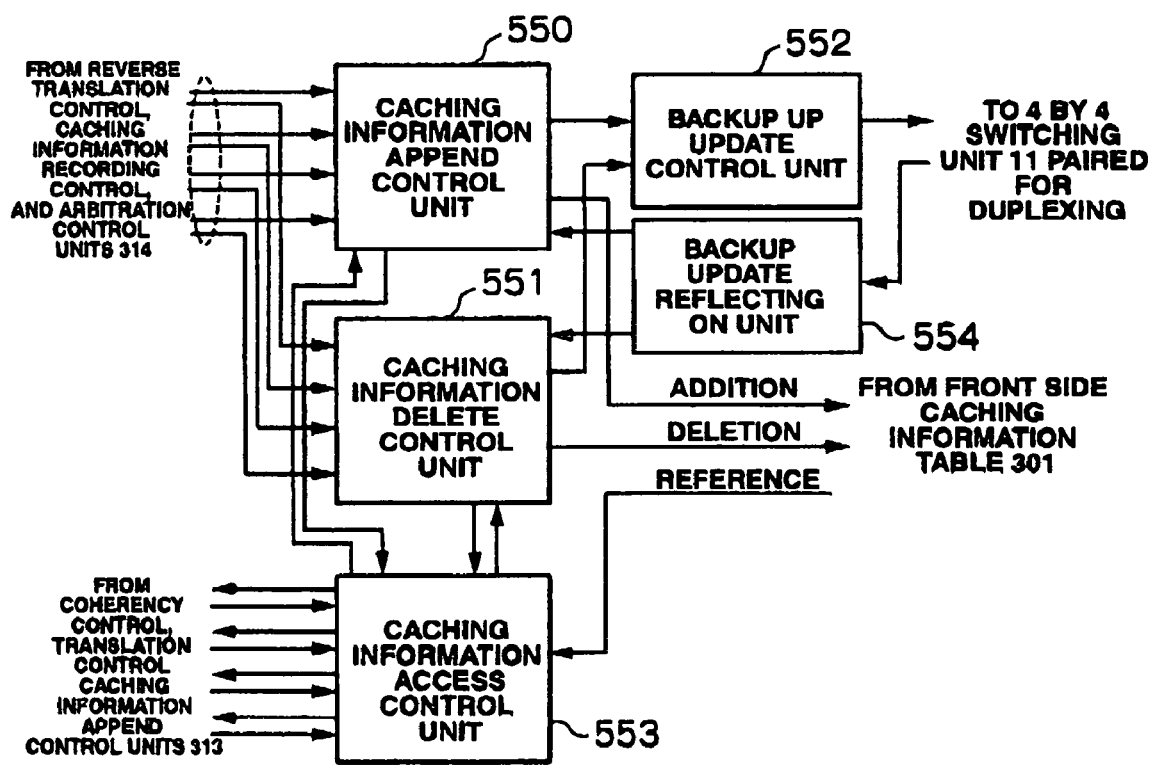
FIG. 18 is a block diagram of the front side caching information management unit.

As shown in FIG. 18, the front side caching information management unit 300 has a caching information append control unit 550, a caching information delete control unit 551, a backup update control unit 552, a caching information access control unit 553, and a backup update reflection unit 554. The caching information append control unit 550 receives signals from the caching information generating unit 543 shown in FIG. 16, and records new caching information in the front side caching information table 301. Likewise, the caching information delete control unit 551 receives signals from the caching information delete instruction generating unit 545 shown in FIG. 16, and deletes the caching information recorded in the front side caching information table 301. Also, receiving instructions from the caching information append control unit 550/caching information delete control unit 551, the backup update control unit 552 reports to the paired 4 by 4 switching unit 11 about the addition/deletion of the caching information that has been performed by the caching information append control unit 550/caching information delete control unit 551 and has that paired 4 by 4 switching unit perform the same addition/deletion of the caching information. On the other hand, the backup update reflection unit 554 receives signals from the paired 4 by 4 switching unit 11, and reports the addition/deletion of the caching information that has been performed in that paired 4 by 4 switching unit 11 to the caching information append control unit 550/caching information delete control unit 551, to have it perform the same addition/deletion of the caching information. The caching information access control unit 553 receives signals from the caching information scan unit 531 shown in FIG. 15, and accesses the caching information table 301 for scanning the caching information. The caching information access control unit 553 can also report to the caching information append control unit 550 about the information of a write request command C3 received from the caching information scan unit 531, and have the caching information append control unit 550 add new caching information mainly for that write request command C3.

On the other hand, when receiving signals from the caching information append control unit 550 indicating new caching information being added, the caching information access control unit 553 accesses the caching information table 301 to check whether the same caching information has already been recorded there or not so that the addition of caching information can be performed correctly, and then returns the check result to the caching information append control unit 550. Likewise, also when receiving signals from the caching information delete control unit 551 indicating certain caching information being deleted, the caching information access control unit 553 accesses the caching information table 301 to check whether the caching information to be deleted is recorded there or not so that the deletion processing can be performed correctly, and returns the check result to the caching information delete control unit 551.

Figure 19:
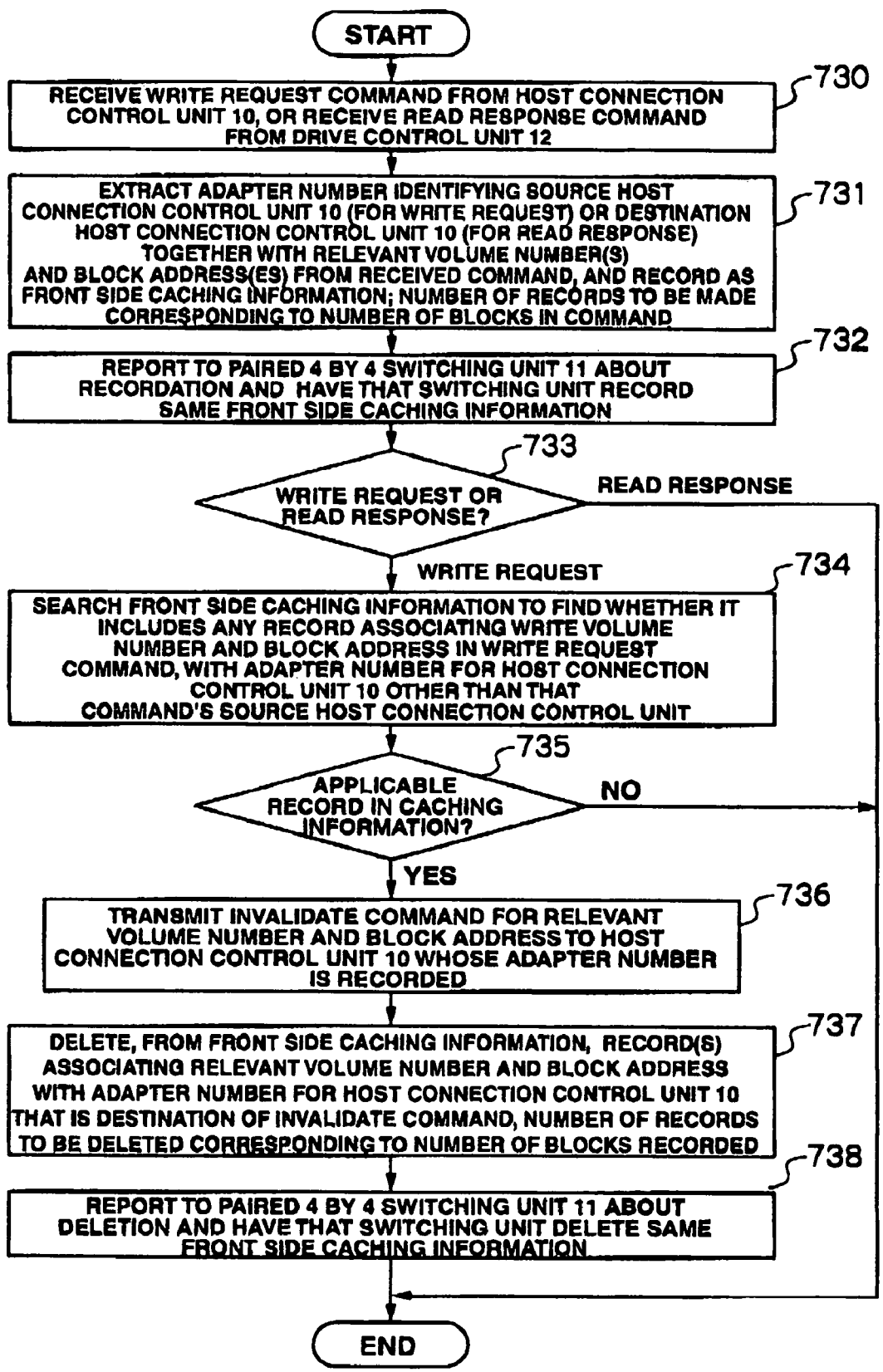
FIG. 19 is a flowchart for explaining the operation performed by the switching unit according to the third embodiment.

Next, the operations related to the cache coherency function will be explained with reference to the flowchart shown in FIG. 19. The cache coherency function explained here means one that keeps the coherency of data stored in some front side caches 104 in the different host connection control units 10. First, in step 730 in FIG. 19, a write request command C3 is received from a host connection control unit 10, or a read response command C2 is received from a drive control unit 12. Next, in step 731, the adapter number identifying the source host connection control unit 10 (if the command is a write request) or the destination host connection control unit 10 (if the command is a read response) together with the relevant volume number and block address is extracted from the received command, and then recorded in the front side caching information table. If the received command involves the transfer of data of two or more blocks, the recordation is performed for the number of blocks specified by the command, each record having a different block address. Then, in step 732, the above recordation of the front side caching information is reported to the other duplex 4 by 4 switching unit 11, making that switching unit record the same information in its front side caching information.

In step 733, the received command is judged as to whether it is a write request or read response command, and if it is a read response command C2, the process ends. If it is a write request command C3, the process goes to step 734. In step 734, the front side caching information is searched to find whether it includes any record associating the same write volume number and block address as in the received write request command C3, with the adapter number for a host connection control unit 10 other than the source host connection control unit 10 of the received command. Then, whether there is any applicable record or not is judged in step 735, based on the above search result. If there is no applicable record, the process ends.

If it is found in step 735 that there is an applicable record, the process goes to step 736, generating an invalidate command C8 for the above volume number and block address and transmitting it to the host connection control unit 10 whose adapter number is recorded with the above volume number and block address. Then, in step 737, records associating the above volume number and block address with the adapter number for the destination host connection control unit 10 of the invalidate command C8 are deleted from the front side caching information, the number of records to be deleted being based on the number of blocks recorded above. Also, in step 738, the above deletion from the front side caching information is reported to the paired 4 by 4 switching unit 11, making the paired switching unit delete the same from its front side caching information, and then the process ends.

According to the above-described embodiment, even if it is necessary to increase the number of paths together with an increase in the number of channel adapters and disk adapters, a desired number of paths can be obtained by arranging a plurality of switches in multiple stages in the direction of data transmission, without increasing the number of connection ports that each switch has, thus improving the scalability of the entire system. At the same time, the virtualization function and cache coherency function can be performed at the switching units, with no need for any processor in the host connection control units or drive control units to perform any function regarding virtualization and cache coherency. All that a processor in the host connection control units and drive control units has to do for cache coherency control is to delete data from their own front side cache as instructed by an invalidate command sent from the switching units.

Figure 20:
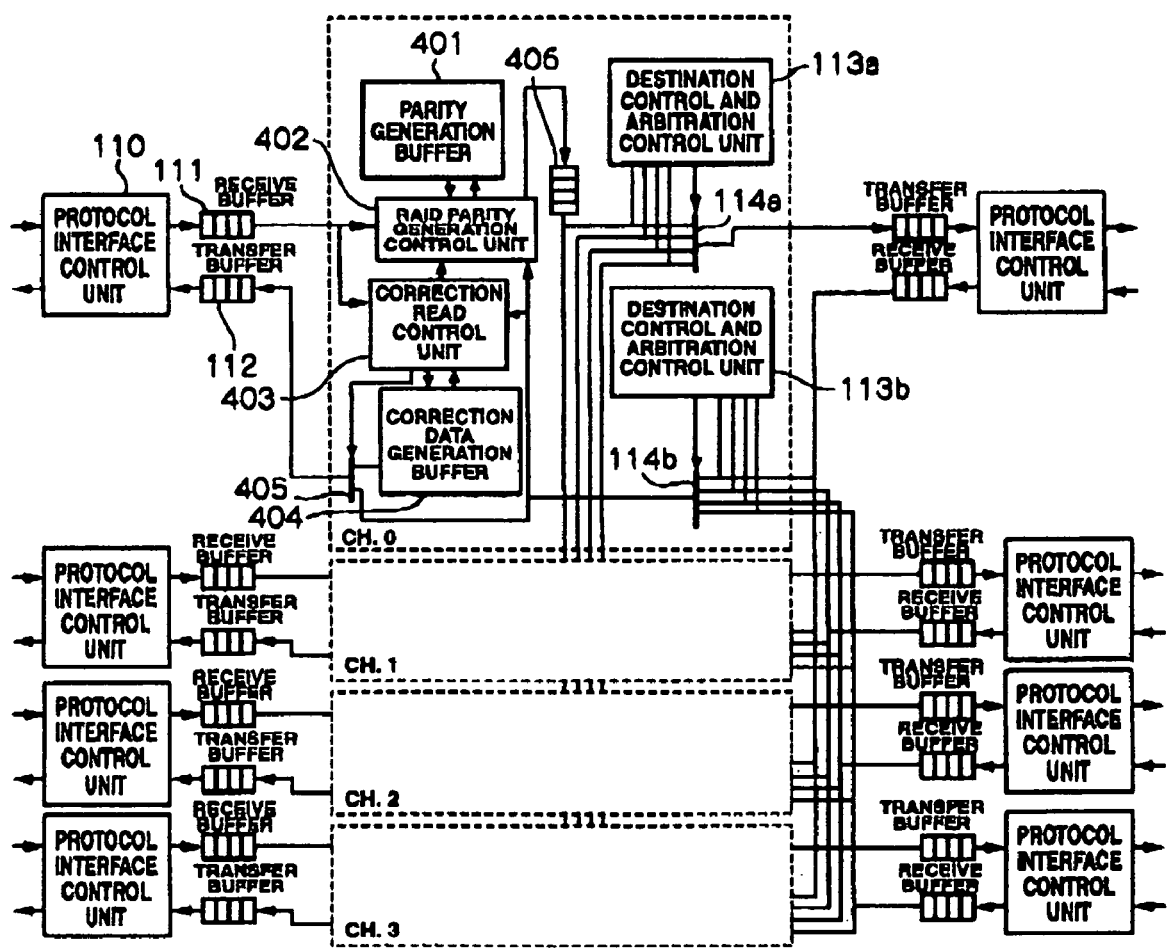
FIG. 20 is a block diagram of a switching unit according to a fourth embodiment of the invention.

Next, a switch according to a fourth embodiment of the invention will be explained with reference to FIG. 20. In this embodiment, each 4 by 4 switching unit 11 has an additional function of RAID control. In addition to the configuration of a basic example shown in FIG. 7, the switching unit according to this embodiment has a parity generation buffer 401, a RAID parity generation control unit 402, a correction read control unit 403, a correction data generation buffer 404, a correction selector 405 and an intermediate buffer 406. The other [remaining] configuration is the same as shown in FIG. 7. If the 4 by 4 switching units 11 are connected to form two or more stages as shown in FIG. 2, the RAID control function shown in FIG. 20 may be implemented in only the 4 by 4 switching units 11 located the closest to the drive control units 12 (i.e., the switching units directly connected to the drive control units 12).

Figure 21:
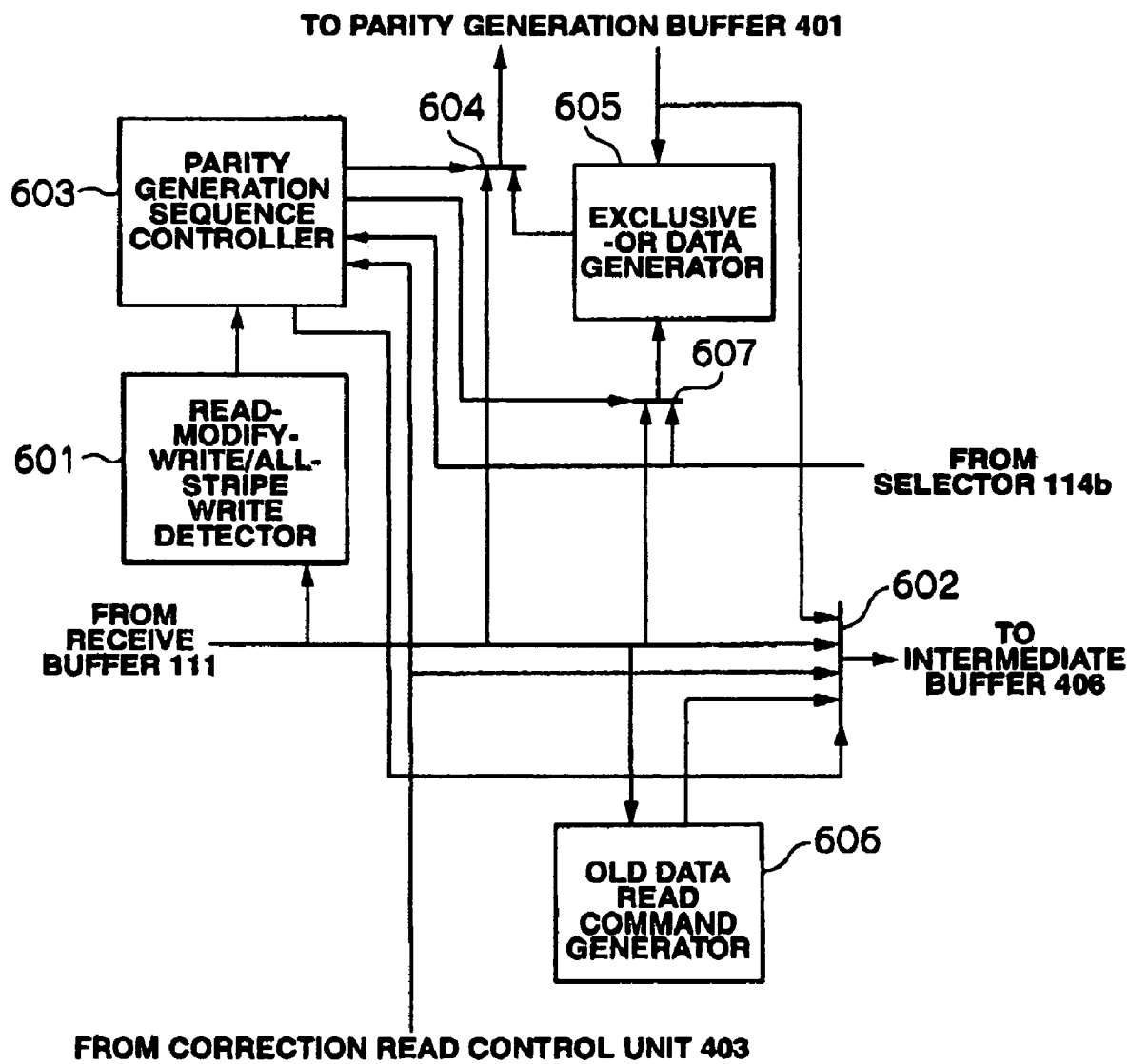
FIG. 21 is a block diagram of the RAID parity generation control unit.

As shown in FIG. 21, the RAID parity generation control unit 402 has a read-modify-write/all-stripe write detector 601, a selector 602 for output to the intermediate buffer 406, a parity generation sequence controller 603, a selector 604 for output to the parity generation buffer 401, an exclusive—or data generator 805, an old data read command generator 606 and a selector 607 for input to the exclusive—or data generator 605. In FIG. 21, the read-modify-write/all-stripe write detector 601 receives inputs from the receive buffer 111, detects a read-modify-write command C5 and an all-stripe write command C4, and reports the detection of the two commands to the parity generation sequence controller 603 to make it deal with the commands. The parity generation sequence controller 603 controls the overall function performed in the RAID parity generation control unit 402, and, for example, controls the operation shown in FIG. 24 if a read-modify-write command C5 is detected, and controls the operation shown in FIG. 23 if an all-stripe write command C4 is detected.

Receiving instructions from the parity generation sequence controller 603, the selector 602 transmits a normal command from the receive buffers 111 directly to the intermediate buffer 406; transmits data from the parity generation buffer 401 as a write request command C3; or transmits an old data read command generated by the old data read command generator 606; and it also transmits a read request command C1 in response to a request from the correction read control unit 403. Also, the selector 604 outputs to the parity generation buffer 401 write data included in a read-modify-write command C5 and in an all-stripe write command C4 received from the receive buffer 111, or outputs to the parity generation buffer 401 the data generated by the exclusive—or data generator 605. The exclusive—or data generator 605 generates exclusively or—ed data between the data in the parity generation buffer 401 and either an output from the selector 114b or write data included in an all-stripe write command C4 from the receive buffer 111, which is selected by the selector 607, and then transmits the generated exclusively or—ed data to the selector 604. The old data read command generator 606 generates a read request command for reading old data, which corresponds to the process in step 763 in the execution of a read-modify-write command C5 shown in FIG. 24.

Figure 22:
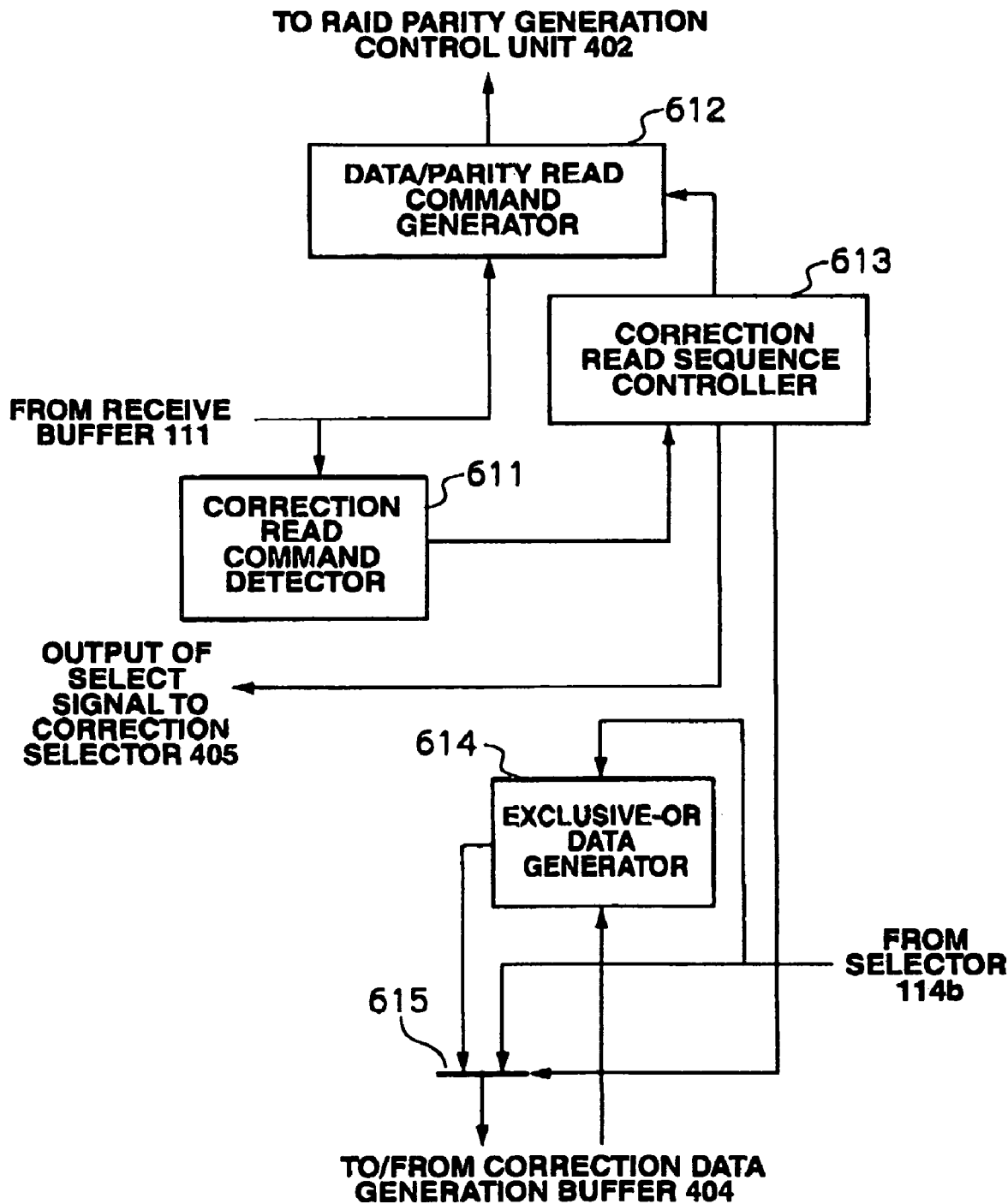
FIG. 22 is a block diagram of the correction read control unit.
Figure 25:
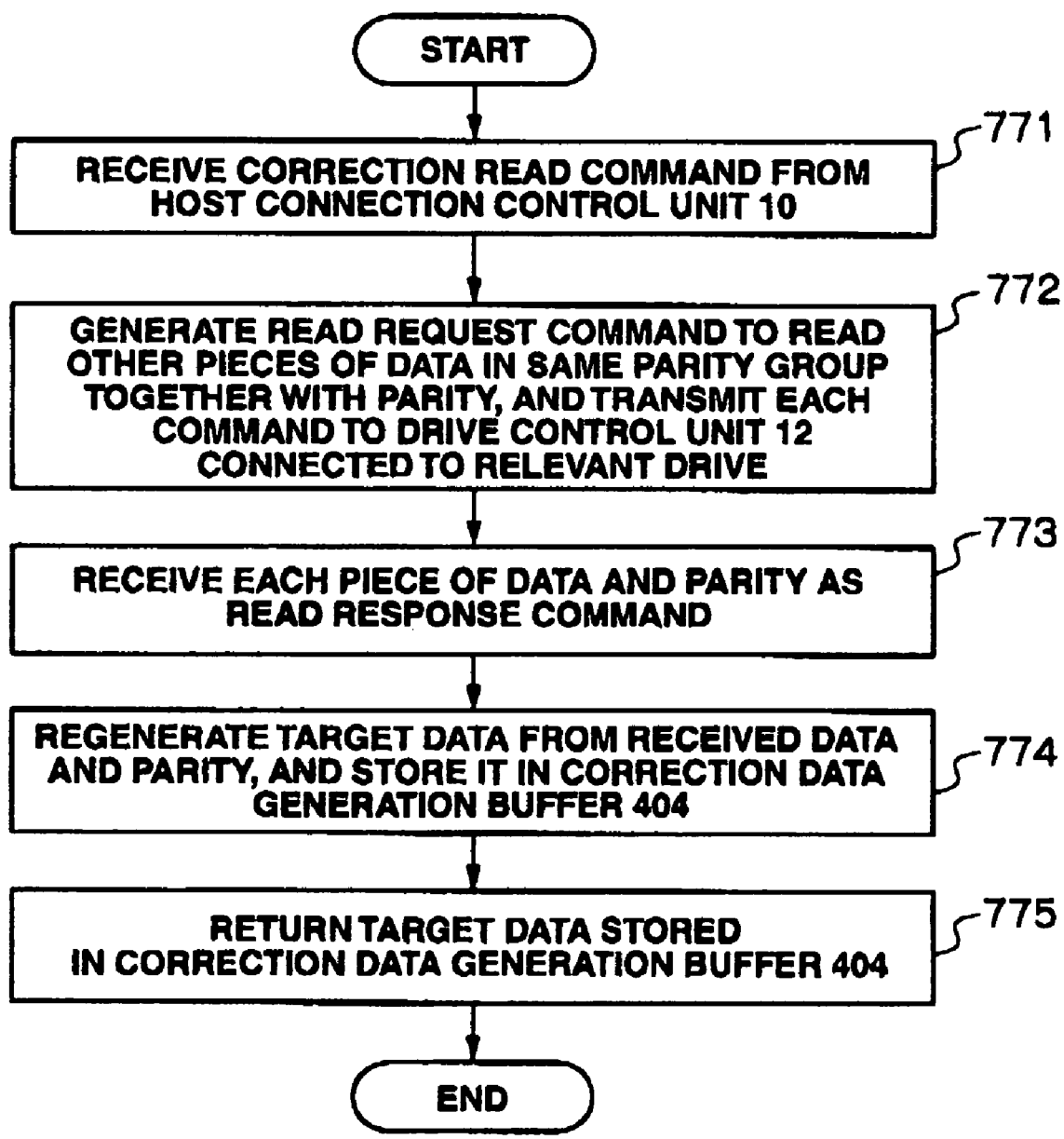
FIG. 25 is a flowchart for explaining the operation performed when data is recovered using a correction read command.

As shown in FIG. 22, the correction read control unit 403 has a correction read command detector 611, a data/parity read command generator 612, a correction read sequence controller 613, an exclusive—or data generator 614, and a selector 615 for output to the correction data generation buffer 404. In FIG. 22, the correction read command detector 611 determines if a command from the receive buffer 111 is a correction read command C7, and reports the detection of a correction read command C7 to the correction read sequence controller 613. The correction read sequence controller 613 controls the overall functions of the correction read control unit 403, and in response to signals from the correction read command detector 611, controls operations, for example, as shown in FIG. 25. The data/parity read command generator 612 generates a read request command to read the other data remaining in the same parity group and the relevant parity data and transmits it to the intermediate buffer 406 via the RAID parity generation control unit 402, which corresponds to the process in step 772 in FIG. 25. The exclusive—or data generator 614 regenerates the target data by generating exclusively or—ed data between read data included in a read response command C2 sent from the selector 114*b*, and data in the correction data generation buffer 404, which corresponds to the process in step 774 in FIG. 25. The selector 615 for output to the correction data generation buffer 404 selects either outputs from the exclusive—or data generator 614 or read data included in a read response command C2 transmitted from the selector 114*b*, and outputs the selected one to the correction data generation buffer to have it stored in the buffer.

Figure 23:
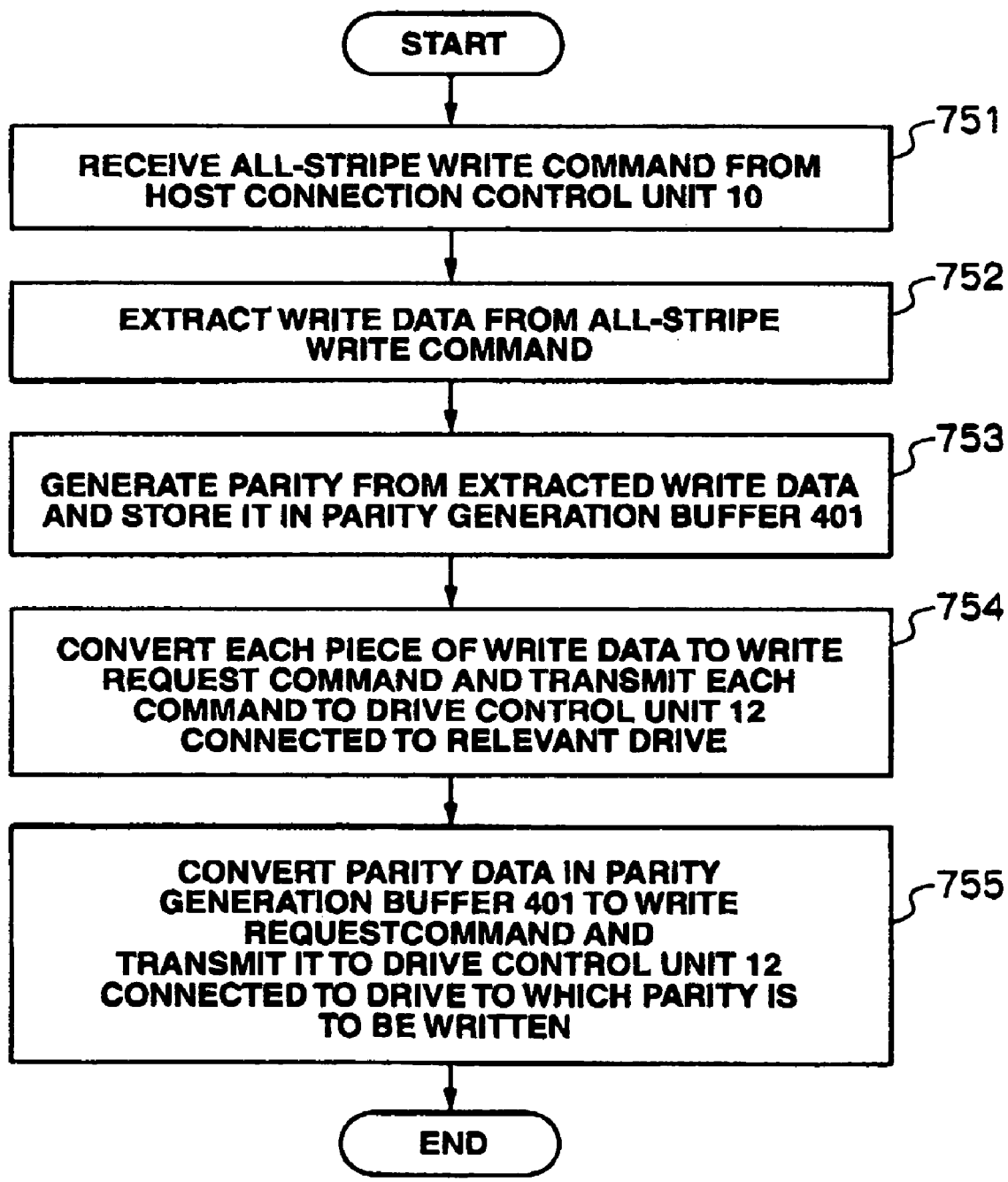
FIG. 23 is a flowchart for explaining the operation performed when RAID parity is generated using an all-stripe write command.

Next, the operation where RAID parity is generated according to an all-stripe write command C4 will be explained with reference to the flowchart shown in FIG. 23. If an all-stripe write command C4 is received from a host connection control unit 10 in the step 751 in FIG. 23, write data is then extracted from that all-stripe write command C4 in the step 752. In the step 753, parity data is generated from the extracted write data and stored in the parity generation buffer 401. In the step 754, the extracted write data is converted to a write request command C3 and transmitted to the drive control unit 12 connected to the relevant disk drive(s). Finally, in the step 755, the parity data stored in the parity generation buffer 401 is converted to a write request command C3 and transmitted to the drive control unit 12 connected to the disk drive(s) 13 to which the parity data is to be written.

Figure 24:
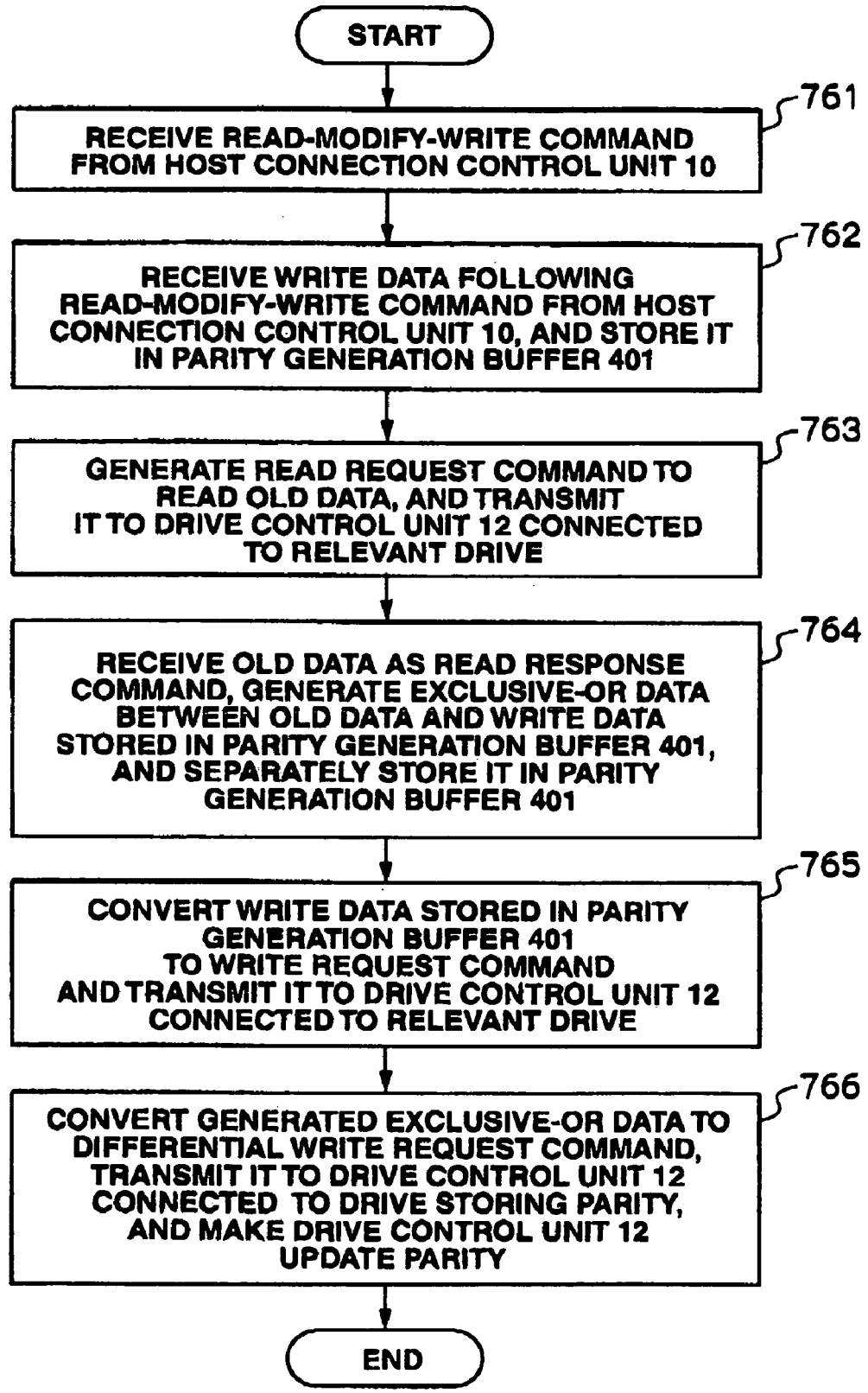
FIG. 24 is a flowchart for explaining the operation performed when RAID parity is generated using a read-modify-write command.

Next, the operation where RAID parity is generated according to a read-modify-write command will be explained with reference to the flowchart shown in FIG. 24. If a read-modify-write command C5 is received from a host connection control unit 10 in the step 761 in FIG. 24, write data in that read-modify-write command C5 is then received in the step 762 and stored in the parity generation buffer 401. In the step 763, a read request command C1 is generated to read the old data, and is transmitted to the drive control unit 12 connected to the relevant disk drive(s) 13. Then, in the step 764, when a read response command C2 is received from the above drive control unit 12, the old data is extracted from that command, generating exclusively or—ed data between the old data and the write data stored in the parity generation buffer 401 to get difference data. The generated difference data is separately stored in the parity generation buffer 401. Next, in the step 765, the write data stored in the parity generation buffer 401 is converted to a write request command C3 and transmitted to the drive control unit connected to the relevant disk drive(s) 13. Finally, in the step 766, the generated difference data is taken out from the parity generation buffer 401, converted to a differential write request command C6, transmitted to the drive control unit 12 connected to the drive(s) storing the parity data, having the drive control unit 12 update the parity data. The drive control unit 12 that has received the differential write request command C6 first reads the old parity data from the relevant parity data drive(s), and modifies the read parity data by generating exclusively or—ed data between the read parity data and the difference data included in the received differential write request command C6, and then writes back the modified parity data to the original parity data drive(s).

Next, the operation of regenerating the target data using a correction read command will be explained with reference to the flowchart shown in FIG. 25. In FIG. 25, when a correction read command C7 is received from a host connection control unit 10 in the step 771, a read request command C1 is generated in the step 772 to read the remaining data and the parity data, and transmitted to the drive control unit 12 connected to the relevant disk drive(s) 13. Then, in the step 773, the read data and the parity are received as read response commands C2. In the step 774, the target data is regenerated using the above-received data and parity, and is stored in the correction data generation buffer 404. Finally, in the step 775, the regenerated target data stored in the correction data generation buffer 404 is returned to the source host connection control unit 10.

According to the above-described embodiment, even if it is necessary to increase the number of paths together with an increase in the number of channel adapters and disk adapters, a desired number of paths can be obtained by arranging a plurality of switches in multiple stages in the direction of data transmission, without increasing the number of connection ports that each switch has, thus improving the scalability of the entire system. At the same time, the generation of parity, which is important for the RAID function, can be performed at the switching units. Moreover, if any drive failure occurs, data recovery can be performed at the switching units too. Accordingly, since only a small part of operations of data recovery is performed by any processors in the host connection control units and drive control units, performance can be easily improved.

While the invention has been described herewith respect to a limited number of embodiments, those skilled in the art, having the benefit of this disclosure, will appreciate that other embodiments can be devised which do not depart from the scope of the invention disclosed herein. For example, while the storage devices used in the above-described embodiments are disk drives, semiconductor memory such as flash memory may also be used as the storage devices.

What is claimed is:

1. A method for controlling a storage system, the storage system comprising one or more channel adapters sending and receiving information to and from a host computer; one or more disk drives; one or more disk adapters connected to the disk drives and controlling data transmission to and from the disk drives; and a plurality of switches located between the one or more channel adapters and the one or more disk adapters and switching a plurality of paths connecting the one or more channel adapters and the one or more disk adapters, the plurality of switches being connected to form multiple stages in the direction of information transmission, the switches in each stage being connected so that only two paths via the switches are defined from a given channel adapter from among the one or more channel adapters to a given disk adapter from among the one or more disk adapters and the two paths have no switches in common between the given channel adapter and the given disk adapter, each of the two paths going through the same number of switches, and there being another path connecting each of the two switches located in the same stage on the two paths, the method comprising the steps of:

during information transmission via the paths, receiving a command sent from the host computer to a channel adapter from among the one or more channel adapters;

extracting a volume number and a block address from an address included in the received command;

recording the extracted volume number and block address as a set with a number for identifying the channel adapter from which the command has been received;

reporting to the other of the two switches located in the same stage on the two paths, about the recordation of the set of the extracted volume number and block address with the number for identifying the channel adapter from which the command has been received, using the path connecting the two switches located in the same stage on the two paths, to have the other switch perform the same recordation;

judging whether the received command is a data read command or a data write command;

if the received command is judged as being the data write command, checking whether recorded sets of volume numbers and block addresses with numbers for identifying channel adapters from which commands have been received include any set of the volume number and block address extracted from the received command with a number for identifying a channel adapter that is different from the channel adapter from which that command has been received; and if it is found, as a result of the checking, that the volume number and block address extracted from the received command are recorded as a set with a number for identifying a channel adapter that is different from the channel adapter from which that command has been received, reporting to the channel adapter that is different from the channel adapter from which that command has been received, that the data write command has been received.

2. The method for controlling a storage system according to claim 1, further comprising, after the step of reporting that the data write command has been received, the steps of:

deleting the information regarding the relevant set of the volume number and block address with the number for identifying the channel adapter, from the recorded sets of volume numbers and block addresses with numbers for identifying the channel adapters from which the commands have been received; and reporting to the other of the two switches located in the same stage on the two paths, about the deletion of the information regarding the relevant set of the volume number and block address with the number for identifying the channel adapter from the recorded sets of volume numbers and block addresses with numbers for identifying the channel adapters from which the commands have been received, using the path connecting the two switches located in the same stage on the two paths, to have the other switch perform the same deletion.

* * * * *